United States Patent [19]
Toshio et al.

[11] Patent Number: 5,511,723
[45] Date of Patent: Apr. 30, 1996

[54] COMBINATION FAUCET AND METHOD OF MIXING HOT WATER WITH COLD WATER

[75] Inventors: Eki Toshio; Ohtsuka Toshiharu, both of Kitakyushu, Japan

[73] Assignee: Toto Ltd., Japan

[21] Appl. No.: 256,768

[22] PCT Filed: Nov. 22, 1993

[86] PCT No.: PCT/JP93/01712

§ 371 Date: Jul. 22, 1994

§ 102(e) Date: Jul. 22, 1994

[87] PCT Pub. No.: WO94/12920

PCT Pub. Date: Jun. 9, 1994

[30] Foreign Application Priority Data

Nov. 25, 1992 [JP] Japan .................................. 4-339619
Nov. 30, 1992 [JP] Japan .................................. 4-345364
Jan. 8, 1993 [JP] Japan .................................. 5-018169

[51] Int. Cl.⁶ .......................... G05D 11/00; G05D 23/13
[52] U.S. Cl. ...................... 236/12.12; 137/88; 236/101 R
[58] Field of Search ............................ 236/12.12, 12.2, 236/101 R, 12.11; 137/88; 364/502

[56] References Cited

U.S. PATENT DOCUMENTS

| | | | |
|---|---|---|---|
| 4,640,457 | 2/1987 | MacDonald | 236/12.11 |
| 5,025,983 | 6/1991 | Akita | 236/12.2 |
| 5,400,961 | 3/1995 | Tsutsui et al. | 236/12.12 |

FOREIGN PATENT DOCUMENTS

| | | |
|---|---|---|
| 105660 | 7/1984 | Japan . |
| 60-121377 | 6/1985 | Japan . |
| 21215 | 2/1986 | Japan . |
| 150585 | 9/1986 | Japan . |
| 2-80879 | 3/1990 | Japan . |

*Primary Examiner*—William E. Wayner
*Attorney, Agent, or Firm*—Ostrolenk, Faber, Gerb & Soffen

[57] ABSTRACT

A combination faucet compensates for a temperature deviation between a target temperature and actual temperature of a water mixture by utilizing a temperature-sensitive coil spring (80) to press a movable cylinder or axially elongated valve disc (70) that controls a mixing ratio of hot water to cold water. The temperature-sensitive coil spring (80) is constructed of a material that varies the spring constant of spring (80) according to a temperature change. When the temperature-sensitive coil spring (80) by itself cannot provide sufficient correction to compensate for the temperature deviation, feed-back control is utilized for completely eliminating the temperature deviation. To prevent hunting, control gain K of the feed-back control is determined according to variation in the spring constant of coil spring (80). When the temperature deviation is eliminated by the feed-back control, the relationship between a target temperature and a current pre-load adjustment quantity is stored, and is used to determine a pre-load adjustment quantity when the same target temperature is set. When spouting of the water mixture begins or when the target temperature is varied, the feed-back control is not executed until the temperature deviation becomes smaller than a threshold value TR1, to effectively prevent hot water from spouting abruptly after dead water ceases to spout.

19 Claims, 19 Drawing Sheets

COMBINATION FAUCET AND METHOD OF MIXING HOT WATER WITH COLD WATER

BACKGROUND OF THE INVENTION

1. Field of the Invention

The present invention relates to a combination faucet, and more specifically to a combination faucet for mixing hot water with cold water by pressing a movable valve cylinder with a spring, which is composed of a material having a spring constant that varies with the temperature.

2. Description of the Related Art

An automatic temperature controlling combination faucet previously proposed to steadily control the temperature of water mixture of hot water and cold water by pressing a movable valve disc for controlling a mixing ratio of hot water to cold water with a shape memory alloy, which has a shape varied with the temperature (JAPANESE PATENT PUBLICATION GAZETTE No. 61-44062). As generally known, even if a physical force is applied to change the shape of a shape memory alloy having an original shape set at a specific temperature, the shape memory alloy recovers its original shape any time when it is exposed to the specific temperature. The shape memory alloy has a smaller heat capacity and greater sensitivity to the temperature variation than conventional temperature-sensitive elements, such as a thermo-wax.

In a known combination faucet a coil-formed shape memory alloy presses one end of the movable valve disc coil and a coil spring presses the other end of the disc. The coil-formed shape memory alloy is arranged to be in direct contact with the mixture of hot water and cold water, and has a given coil length at a specific temperature. The coil-formed shape memory alloy works in the following manner in response to a variation in the temperature of the water mixture.

When the temperature of the water mixture is stable at a preset temperature, the movable valve disc stops at a position of balance between the coil-formed shape memory alloy and the coil spring. When the temperature of the water mixture is varied to the specific temperature due to some outside disturbance, the coil-formed shape memory alloy generates a shape restoring force to recover the given coil length set at the specific temperature. The shape restoring force destroys the balance between the coil-formed shape memory alloy and the coil spring and moves the movable valve disc towards the coil spring or the coil-formed shape memory alloy. When the coil-formed shape memory alloy is set to change the coil length successively in a temperature range around the preset temperature, the coil-formed shape memory alloy varies its coil length in response to a change in temperature of the water mixture in the vicinity of the preset temperature so as to generate a shape restoring force continuously. This shifts the movable valve disc corresponding to the temperature change of the water mixture and varies the ratio of hot water to cold water, thereby keeping the temperature of the water mixture substantially equal to the preset temperature.

In the known combination faucet with a conventional shape memory alloy, the preset temperature of the water mixture is changed by manually applying a pre-load to the spring for pressing the movable valve disc. This structure does not allow the preset temperature to be changed from outside, for example, using a remote control. When the shape restoring force of the shape memory alloy balances with the resilient force of the coil spring at a certain temperature deviated from the desirable preset temperature, the temperature control only by the shape memory alloy cannot compensate sufficiently for a deviation of the actual temperature of the water mixture from a desirable preset temperature.

Another combination faucet previously proposed does not use a shape memory alloy, but controls the temperature of the water mixture by pressing a movable valve disc for controlling a mixing ratio of hot water to cold water with a temperature-sensitive element such as a thermo-wax and cancels a steady temperature deviation of the actual temperature of the water mixture from a target temperature by utilizing feed-back control (JAPANESE PATENT LAYING-OPEN GAZETTE No. 61-31784). Such a steady temperature deviation results from temperature control of the thermo-wax in a temperature range that deviates from the target temperature, a time-based change in the volume variation of the thermo-wax, and a time-based change of each element where a load is applied due to the volume variation in the thermo-wax. In this combination faucet, a motor-induced driving speed of the movable valve disc is set at less than a thermowax-induced driving speed of the movable valve disc in order to prevent the feed-back control from causing undesirable hunting.

When the feed-back control executed in the combination faucet with a thermo-wax is applied to another combination faucet with a shape memory alloy, a difference in the temperature characteristics between the shape memory alloy and the thermo-wax may cause undesirable hunting. A change in the composition of a shape memory alloy by as little as 0.1% varies a temperature of Martensitic transformation representing the shape memory effects by as much as 10° C. The difference in the Martensitic transformation temperature between different alloy ingots or even different lots may result in insufficient temperature control.

The feed-back control described above may not control the temperature of the water mixture sufficiently close to a target temperature in response to a season-oriented variation in the water supply temperature or pressure or a time-based variation in the spring constant of the shape memory alloy.

At a start of operation, the combination faucet spouts dead water retained in a supply conduit from a water heater to the faucet. During the dead water spouting, water mixture of a desirable temperature does not run from the combination faucet. The feed-back control or another temperature control executed during the dead water spouting makes the opening of the hot water supply unsuitably large, which may cause hot water to abruptly spout immediately after completion of the dead water spouting. Devices proposed for preventing such danger include a mixing control device for forcibly prohibiting operation of a mixing valve until a hot water supply temperature reaches a predetermined value (JAPANESE PATENT LAYING-OPEN GAZETTE No. 61-125532) and another mixing control device for forcibly prohibiting operation of a mixing valve in a predetermined time period since a start of operation (JAPANESE PATENT LAYING-OPEN GAZETTE No. 61-125533).

In the former method, however, the conventional combination faucet requires a temperature sensor in a hot water supply conduit for forcibly prohibiting operation of the mixing valve until a hot water supply temperature reaches a predetermined value. In the latter method, on the other hand, a non-operation time for prohibiting operation of the mixing valve should be set sufficiently long since a time required for spouting dead water varies with the mixing ratio of hot water to cold water and the flow of the water mixture. This undesirably retards the control to the target temperature.

SUMMARY OF THE INVENTION

Accordingly, one object of the present invention is to provide a combination faucet which keeps the temperature a mixture of hot water and cold water substantially equal to a target temperature.

Another object of the invention is to maintain the temperature of the water mixture stably at the target temperature, irrespective of a season-oriented variation in the cold water supply temperature or a time-based variation in the spring constant.

Still another object of the invention is to enhance the speed of spouting of dead water retained in supply conduits to allow the temperature of the water mixture to be stably kept at the target temperature.

The instant invention is directed to a combination faucet having a first structure which is shown in FIG. 1, and includes:

a mixing valve MV1 having a movable valve member for adjusting a mixing ratio of hot water to cold water;

a first spring SP11 composed of a material which varies a spring constant of the first spring SP11 according to a temperature variation in a predetermined temperature range, the first spring SP11 pressing the movable valve disc in a predetermined first direction for reducing the ratio of hot water to cold water in response to an increase in a temperature of the mixture of hot water and cold water flowing out of the mixing valve MV1;

a second spring SP12 for pressing the movable valve cylinder in a predetermined second direction opposite to the predetermined first direction;

pre-load adjustment means M11 for adjusting a pre-load of the first spring SP11 and/or the second spring SP12;

temperature detection means M12 for detecting the temperature of the water mixture;

initial pre-load setting means M13 for controlling the pre-load adjustment means M11 to set the pre-load equal to an initial value corresponding to a target temperature of the water mixture; and electronic control means M14 for, when the temperature of the water mixture detected by the temperature detection means M12 deviates from the target temperature after a setting of the pre-load by the initial pre-load setting means M13, controlling the pre-load adjustment means M11 to compensate for the deviation.

In the combination faucet having the first structure, the pre-load adjustment means M11 may include means for changing an effective length of the first spring or the second spring, means for pressing the movable valve disc in a pressing direction of the first spring or the second spring by means of electromagnetic induction, or alternatively heating means for controlling temperature of the first spring regardless of the temperature of the water mixture.

In the combination faucet of the first structure, when spouting of water mixture starts, the initial pre-load setting means M13 controls the pre-load adjustment means M11 to adjust the position of the movable valve disc to have an initial value corresponding to a target temperature of the water mixture. The first spring SP11 varies its spring constant in response to the temperature of the water mixture and presses the movable valve disc for adjusting the mixing ratio of hot water to cold water, so as to control the temperature of water mixture close to the target temperature. When the temperature control by the first spring SP11 only cannot sufficiently compensate for a deviation of the temperature of the water mixture from the target temperature, the electronic control means M14 drives the pre-load adjustment means M11 to eliminate the deviation and make the temperature of the water mixture substantially equal to the target temperature.

The combination faucet of the first structure effectively controls the temperature of the water mixture with the first spring, which is composed of a material that varies the spring constant according to a temperature change in a predetermined temperature range. When an equilibrium of spring forces of the first spring SP11 and the second spring SP12 at a certain temperature that differs from the target temperature causes a deviation of the actual temperature of the water mixture from the target temperature, the electronic control means M14 controls the pre-load adjustment means M11 to compensate for the deviation and keep the temperature of the water mixture sufficiently close to the target temperature. The temperature hysteresis, the time-based variation of the spring constant, and the difference in characteristics between different lots of the first spring SP11 may cause a similar deviation of the temperature of the water mixture from the target temperature. In such a case, the pre-load adjustment means M11 is also controlled to compensate for the deviation and make the temperature of the water mixture substantially equal to the target temperature.

According to another aspect of the invention, as shown in FIG. 2, a combination faucet having a second structure includes:

a mixing valve MV2 having a movable valve member for adjusting a mixing ratio of hot water to cold water;

a first spring SP21 composed of a material which varies the spring constant of the first spring SP21 according to a temperature variation in a predetermined temperature range, the first spring SP21 pressing the movable valve disc in a predetermined first direction for reducing the ratio of hot water to cold water in response to an increase in a temperature of the water mixture of hot water and cold water flowing out of the mixing valve MV2;

a second spring SP22 for pressing the movable valve disc in a predetermined second direction opposite to the predetermined first direction;

pre-load adjustment means M21 for adjusting a pre-load of the first spring SP21 and/or the second spring SP22;

temperature detection means M22 for detecting the temperature of the water mixture;

pre-load control means M23 for, when the temperature of the water mixture detected by the temperature detection means M22 deviates from a target temperature, feed-back controlling the pre-load adjustment means M21 to compensate for the deviation; and control gain determination means M24 for determining a gain of the feed-back control based on mixing conditions of hot water and cold water.

In the combination faucet of the second structure, the control gain determination means M24 may include means for determining the gain based on the temperature of the water mixture, or means for determining the gain based on a variation of the spring constant of the first spring in response to the temperature of the water mixture. According to another preferable embodiment, the control gain determination means M24 may include means for setting the gain equal to a predetermined first value when the temperature of the water mixture detected by the temperature detection means is in a first range where a variation of the spring constant of the first spring is steady, and for setting the gain equal to a predetermined second value when the temperature of the water mixture is in a second range where the variation of the spring constant is not steady.

In the combination faucet having the second structure, the first spring SP21 varies its spring constant in response to the temperature of the water mixture and presses the movable valve disc for adjusting the mixing ratio of hot water to cold water, so as to control the temperature of water mixture close to the target temperature. Temperature control by the first spring SP21 only may not be sufficient to compensate for a deviation of the temperature of the water mixture detected by the temperature detection means M22 from the target temperature. In such a case, the control gain determination means M24 determines a gain of a feed-back control based on mixing conditions of hot water and cold water, and the pre-load control means M23 controls the pre-load adjustment means M21 to compensate for the deviation and keep the temperature of the water mixture sufficiently close to the target temperature.

The combination faucet of the second structure determines the control gain of a feed-back control based on the mixing conditions of hot water and cold water, thereby allowing the temperature of the water mixture to be controlled sufficiently close to the target temperature without causing undesirable hunting. The combination faucet includes the first spring SP21 which is composed of a material that varies the spring constant according to a temperature change in a predetermined temperature change. The first spring SP21 also works to control the temperature of the water mixture. When an equilibrium of spring forces of the first spring SP21 and the second spring SP22 at a certain temperature that differs from the target temperature, causes a deviation of the actual temperature of the water mixture from the target temperature, the pre-load adjustment means M21 is controlled to compensate for the deviation and keep the temperature of the water mixture sufficiently close to the target temperature.

The invention is also directed to a combination faucet having a third structure as shown in FIG. 3. The combination faucet of the third structure includes:

a mixing valve MV3 having a movable valve member for adjusting a mixing ratio of hot water to cold water;

a first spring SP31 composed of a material which varies the spring constant of the first spring SP31 according to a temperature variation in a predetermined temperature range, the first spring SP31 pressing the movable valve disc in a predetermined first direction for reducing the ratio of hot water to cold water in response to an increase in a temperature of the water mixture of hot water and cold water flowing out of the mixing valve MV3;

a second spring SP32 for pressing the movable valve disc in a predetermined second direction opposite to the predetermined first direction;

pre-load adjustment means M31 for adjusting a pre-load of the first spring SP31 and/or the second spring SP32;

temperature detection means M32 for detecting the temperature of the water mixture, initial pre-load setting means M33 for controlling the pre-load adjustment means M31 to set the pre-load equal to an initial value corresponding to a target temperature of the water mixture, control determination means M34 for, when the temperature of the water mixture detected by the temperature detection means M32 deviates from the target temperature after a setting of the pre-load by the initial pre-load setting means M33, determining whether a feed-back control is to be executed or not according to a magnitude of the deviation, and pre-load control means M35 for, when the control determination means M34 determines execution of the feed-back control, controlling the pre-load adjustment means M31 to compensate for the deviation.

In the combination faucet of the third structure, the control determination means M34 may include means for determining execution of the feed-back control when the deviation is within a predetermined range and determining non-execution of the feed-back control when the deviation is out of the predetermined range. Alternatively, the control determination means M34 may include means for determining non-execution of the feed-back control when the deviation is within a predetermined first range, determining execution of the feed-back control when the deviation is out of the predetermined first range but within a predetermined second range which is greater than the predetermined first range, and determining non-execution of the feed-back control when the deviation is out of the predetermined second range.

In the combination faucet having the third structure, when spouting of a water mixture starts, the initial pre-load setting means M33 controls the pre-load adjustment means M31 to adjust the position of the movable valve disc to have an initial value corresponding to a target temperature for a water mixture. The first spring SP31 varies its spring constant in response to the temperature of the water mixture and presses the movable valve disc for adjusting the mixing ratio of hot water to cold water, so as to control the temperature of the water mixture close to the target temperature. When a deviation of the water mixture temperature detected by the temperature detection means M32 from the target temperature exists in a predetermined range, the pre-load control means M35 controls the pre-load adjustment means M31 to compensate for the deviation and keep the of water mixture temperature sufficiently close to the target temperature.

The combination faucet of the third structure previously sets a pre-load corresponding to a target temperature at a start of water mixture spouting, and does not execute the feed-back control until a deviation of the water mixture temperature from the target temperature becomes within a predetermined range. This effectively prevents hot water from spouting immediately after completion of dead water spouting, and allows quick approach of the water mixture temperature to the target temperature. During the dead water spouting, the spring constant of the first spring SP31 varies and first spring SP31 presses the movable valve disc to increase the ratio of hot water, thus enhancing the speed of dead water spouting. The combination faucet includes the first spring SP31 which is composed of a material that varies the spring constant according to a temperature change in a predetermined temperature range. The first spring SP31 also works to control the temperature of the water mixture. When an equilibrium of spring forces of the first spring SP31 and the second spring SP32 at a certain temperature deviated from the target temperature causes a deviation of the actual temperature of the water mixture from the target temperature, the pre-load adjustment means M31 is controlled to compensate for the deviation and keep the temperature of the water mixture sufficiently close to the target temperature.

According to another aspect of the invention, a combination faucet having a fourth structure as illustrated in FIG. 4 includes:

a mixing valve MV4 having a movable valve member for adjusting a mixing ratio of hot water to cold water;

a first spring SP41 composed of a material which varies the spring constant of the first spring SP41 according to a temperature variation in a predetermined temperature range, the first spring SP41 pressing the movable valve disc in a predetermined first direction for reducing the ratio of hot water to cold water in response to an increase in a temperature of the mixture of hot water and cold water flowing out of the mixing valve MV4;

a second spring SP42 for pressing the movable valve disc in a predetermined second direction opposite to the predetermined first direction;

pre-load adjustment means M41 for adjusting a pre-load of the first spring SP41 and/or the second spring SP42;

temperature detection means M42 for detecting the temperature of the water mixture;

pre-load memory means M43 for storing a relationship between a target temperature of the water mixture and the pre-load;

pre-load setting means M44 for controlling the pre-load adjustment means M41 to set the pre-load equal to an initial value corresponding to the target temperature according to the relationship stored in the pre-load memory means M43;

pre-load control means M45 for, when the temperature of the water mixture detected by the temperature detection means M42 deviates from the target temperature after the setting of the pre-load by the pre-load setting means M44, controlling the pre-load adjustment means M41 to compensate for the deviation; and updating means M46 for updating the relationship stored in the pre-load memory means M43 with a new set of values for the target temperature and the pre-load when the deviation of the temperature of the water mixture detected by the temperature detection means M42 from the target temperature fulfills a predetermined condition.

In the combination faucet having the fourth structure, at a start of water mixture spouting, the pre-load setting means M44 controls the pre-load adjustment means M41 to set a pre-load equal to an initial value corresponding to a target temperature based on a relationship between the target temperature of the water mixture and the pre-load stored in the pre-load memory means M43. During spouting of the water mixture, the constant first spring SP41 varies in response to the temperature of the water mixture and presses the movable valve disc for adjusting the mixing ratio of hot water to cold water, so as to control the temperature of water mixture close to the target temperature. When the temperature of the water mixture detected by the temperature detection means M42 deviates from the target temperature, the pre-load control means M45 controls the pre-load adjustment means M41 to compensate for the deviation and keep the temperature of the water mixture substantially equal to the target temperature. The updating means M46 updates the relationship stored in the pre-load memory means with a new set of values of the target temperature and the pre-load when the deviation of the actual temperature detected by the temperature detection means M42 from the target temperature fulfills a predetermined condition.

The combination faucet of the fourth structure updates the relationship stored in the pre-load memory means M43 with a new set of values of the target temperature and the pre-load when the deviation of the actual temperature of the water mixture from the target temperature fulfills a predetermined condition. The pre-load setting means M44 drives the pre-load adjustment means M41 to set a pre-load equal to an initial value corresponding to the target temperature based on the relationship thus updated. This allows an adequate pre-load to be set with respect to the varied spring characteristics of the first spring SP41. This also allows setting of an adequate pre-load regardless of a season-oriented variation in the cold water supply temperature and the hot water supply temperature or a time-based change of the spring constant of the first spring SP41 or the second spring SP42. The combination faucet includes the first spring SP41 which is composed of a material that varies the spring constant according to a temperature change in a predetermined temperature range. The first spring SP41 also works to control the temperature of the water mixture. When an equilibrium of spring forces of the first spring SP41 and the second spring SP42 at a certain temperature deviated from the target temperature causes a deviation of the actual temperature of the water mixture from the target temperature, the pre-load adjustment means M41 is controlled to compensate for the deviation and keep the temperature of the water mixture sufficiently close to the target temperature.

According to still another aspect of the invention, a combination faucet having a fifth structure shown in FIG. 5 includes:

a mixing valve MV5 having a movable valve member for adjusting a mixing ratio of hot water to cold water;

a first spring SP51 composed of a material which varies a spring constant of the first spring SP51 according to a temperature variation in a predetermined temperature range, the first spring SP51 pressing the movable valve disc in a predetermined first direction for reducing the ratio of hot water to cold water in response to an increase in temperature of the water mixture of hot water and cold water flowing out of the mixing valve;

a second spring SP52 for pressing the movable valve disc in a predetermined second direction opposite to the predetermined first direction;

pre-load adjustment means M51 for adjusting a pre-load of the first spring SP51 and/or the second spring SP52;

plural pre-loads memory means M52 for storing a plurality of relations between the pre-load and a target temperature of the water mixture;

pre-load selection means M53 for selecting one relation, based on inputs of predetermined data, among the plurality of relations between the pre-load and the target temperature stored in the plural pre-loads memory means M52, and pre-load setting means M54 for controlling the pre-load adjustment means M51 to set the pre-load equal to an initial value corresponding to the target temperature according to the relation selected by the pre-load selection means M53.

In a preferable application, the combination faucet of the fifth structure further includes:

temperature detection means for detecting the temperature of the water mixture; and pre-load control means for, when the temperature of the water mixture detected by the temperature detection means deviates from the target temperature after the setting of the pre-load by the pre-load setting means M54, controlling the pre-load adjustment means M51 to compensate for the deviation.

In the combination faucet having the fifth structure, at a start of water mixture spouting, the pre-load setting means M54 controls the pre-load adjustment means M51 to set a pre-load equal to an initial value corresponding to a target temperature, based on the relation selected by the pre-load selection means among a plurality of relations between the target temperature and the pre-load stored in the plural pre-loads memory means M52. During the spouting of water mixture, the first spring SP51 varies its spring constant in response to the temperature of the water mixture and presses the movable valve disc for adjusting the mixing ratio of hot water to cold water, so as to control the temperature of the water mixture close to the target temperature.

The combination faucet of the fifth structure selects one of the plural relations between the target temperature and the pre-load according to inputs of predetermined data, and sets a pre-load equal to an initial value corresponding to a target temperature based on the selected relation. This structure easily sets the pre-load equal to an adequate initial value according to the cold water supply temperature and the hot water supply temperature, and allows the temperature of water mixture to approach the target temperature quickly. In a preferable structure of the combination faucet including the pre-load control means, even when the initially set pre-load causes a deviation of the temperature of the water mixture from the target temperature, the pre-load control means drives the pre-load adjustment means M51 to compensate for the deviation and keep the temperature of the water mixture sufficiently close to the target temperature. The combination faucet includes the first spring SP51 which is composed of a material that varies the spring constant according to a temperature change in a predetermined temperature range. The first spring SP51 also works to control the temperature of the water mixture.

The invention is further directed to a first method of mixing hot water with cold water, the method regulating a mixing ratio of hot water to cold water based on a position of a movable valve disc disposed in a mixing valve, the position of the movable valve disc being determined by:

pressing the movable valve disc with a first spring in a predetermined first direction for reducing the mixing ratio of hot water to cold water in response to an increase in a temperature of the mixture of hot water and cold water flowing out of the mixing valve, the first spring being composed of a material which varies the constant of the first spring according to a temperature variation in a predetermined temperature range; and pressing the movable valve disc with a second spring in a predetermined second direction opposite to the predetermined first direction, the method further including the steps of:
(a) adjusting a pre-load of the first spring and/or the second spring to set the pre-load equal to an initial value corresponding to a target temperature of the water mixture;
(b) detecting the temperature of the water mixture after the step (a); and
(c) when the temperature of the water mixture detected in the step (b) deviates from the target temperature, adjusting the pre-load of the first spring and/or the second spring to compensate for the deviation.

In the first method, a pre-load of the first spring and/or the second spring is adjusted to be set equal to an initial value corresponding to a target temperature of the water mixture. After the setting of the pre-load, the temperature of the water mixture is detected. When the detected temperature deviates from the target temperature, the pre-load of the first spring and/or the second spring is adjusted to cancel the deviation.

The first method of the invention effectively controls the temperature of the water mixture with the first spring, which is composed of a material that varies the spring constant according to a temperature change in a predetermined temperature range. When an equilibrium of spring forces of the first spring and the second spring at a certain temperature deviated from the target temperature causes a deviation of the actual temperature of the water mixture from the target temperature, the pre-load of the first spring and/or the second spring is adjusted to cancel the deviation and keep the temperature of the water mixture sufficiently close to the target temperature. The temperature hysteresis, the time-based variation of the spring constant, and the difference in characteristics between different lots of the first spring may cause a similar deviation of the temperature of the water mixture from the target temperature. In such a case, the pre-load of the first spring and/or the second spring is adjusted to compensate for the deviation and make the temperature of the water mixture substantially equal to the target temperature.

The invention provides a second method of mixing hot water with cold water, the method regulating a mixing ratio of hot water to cold water based on the position of a movable valve disc disposed in a mixing valve, the position of the movable valve disc being determined by:

pressing the movable valve disc with a first spring in a predetermined first direction for reducing the mixing ratio of hot water to cold water in response to an increase in a temperature of the mixture of hot water and cold water flowing out of the mixing valve, the first spring being composed of a material which varies a spring constant of the first spring according to a temperature variation in a predetermined temperature range; and pressing the movable valve disc with a second spring in a predetermined second direction opposite to the predetermined first direction, the method further comprising the steps of:
(a) detecting the temperature of the water mixture;
(b) when the temperature of the water mixture detected in the step (a) deviates from a target temperature, determining a gain of a feed-back control based on mixing conditions of hot water and cold water; and
(c) feed-back controlling the pre-load of the first spring and/or the second spring based on the gain to compensate for the deviation.

In the second method, after the start of water mixture spouting, the temperature of the water mixture is detected first. When the detected temperature deviates from the target temperature, the gain of the feed-back control is determined according to the mixing conditions of hot water and cold water. The pre-load of the first spring and/or the second spring is then feed-back controlled with the gain to compensate for the deviation.

The second method of the invention determines the control gain of a feed-back control based on the mixing conditions of hot water and cold water, thereby allowing the temperature of the water mixture to be controlled sufficiently close to the target temperature without causing undesirable hunting. The method also controls the temperature of the water mixture using the first spring, which is composed of a material that varies the spring constant according to a temperature change in a predetermined temperature range. When an equilibrium of spring forces of the first spring and the second spring at a certain temperature deviated from the target temperature causes a deviation of the actual temperature of the water mixture from the target temperature, the pre-load of the first spring and/or the second spring is feed-back controlled to compensate for the deviation and keep the temperature of the water mixture sufficiently close to the target temperature.

The invention is also directed to a third method of mixing hot water with cold water, the third method regulating a mixing ratio of hot water to cold water based on a position of a movable valve disc disposed in a mixing valve, the position of the movable valve disc being determined by:

pressing the movable valve disc with a first spring in a predetermined first direction for reducing the mixing ratio of hot water to cold water in response to an increase in a temperature of the water mixture of hot water and cold water flowing out of the mixing valve, the first spring being composed of a material which varies a spring constant of the first spring according to a temperature variation in a predetermined temperature range; and pressing the movable valve disc with a second spring in a predetermined second direction opposite to the predetermined first direction, the method further comprising the steps of:

(a) adjusting a pre-load of the first spring and/or the second spring to set the pre-load equal to an initial value corresponding to a target temperature of the water mixture;

(b) detecting the temperature of the water mixture after the step (a);

(c) when the temperature of the water mixture detected in the step (b) deviates from the target temperature, determining whether a feed-back control is to be executed or not based on a magnitude of the deviation; and (d) when execution of the feed-back control is determined in the step (c), controlling the pre-load of the first spring and/or the second spring to compensate for the deviation.

In the third method, a pre-load of the first spring and/or the second spring is adjusted to be set equal to an initial value corresponding to a target temperature of the water mixture. After the setting of the pre-load, the temperature of the water mixture is detected. When the detected temperature deviates from the target temperature, it is determined, based on the magnitude of the deviation, whether a feed-back control is to be executed or not. When execution of the feed-back control is determined, the pre-load of the first spring and/or the second spring is controlled to cancel the deviation.

According to the third method of the invention, a pre-load corresponding to a target temperature is set at a start of water mixture spouting, and the feed-back control is not executed until a deviation of the temperature of the water mixture from the target temperature becomes within a predetermined range. This effectively prevents hot water from spouting immediately after completion of dead water spouting, and allows the temperature of the water mixture to approach the target temperature rapidly. During the dead water spouting, the first spring varies its spring constant and presses the movable valve disc to increase the ratio of hot water, thus enhancing the speed of dead water spouting. The method also controls the temperature of the water mixture by using the first spring, which is composed of a material that varies the spring constant according to a temperature change in a predetermined temperature range. When an equilibrium of spring forces of the first spring and the second spring at a certain temperature deviated from the target temperature causes a deviation of the actual temperature of the water mixture from the target temperature, the pre-load of the first spring and/or the second spring is controlled to compensate for the deviation and keep the temperature of the water mixture sufficiently close to the target temperature.

The invention also provides a fourth method of mixing hot water with cold water by regulating a mixing ratio of hot water to cold water based on a position of a movable valve disc disposed in a mixing valve, the position of the movable valve disc being determined by:

pressing the movable valve disc with a first spring in a predetermined first direction for reducing the mixing ratio of hot water to cold water in response to an increase in a temperature of the mixture of hot water and cold water flowing out of the mixing valve, the first spring being composed of a material which varies a spring constant of the first spring according to a temperature variation in a predetermined temperature range; and pressing the movable valve disc with a second spring in a predetermined second direction opposite to the predetermined first direction, the method further comprising the steps of:

(a) storing a relationship between a target temperature of the water mixture and a pre-load;

(b) adjusting a pre-load of the first spring and/or the second spring to set the pre-load equal to an initial value corresponding to a target temperature of the water mixture based on the relationship stored in the step (a);

(c) detecting the temperature of the water mixture after the step (b);

(d) when the temperature of the water mixture detected in the step (c) deviates from the target temperature, adjusting the pre-load of the first spring and/or the second spring to compensated for the deviation; and (e) updating the relationship stored in the step (a) with a new set of values of the target temperature and the pre-load when the deviation of the temperature of the water mixture detected by the temperature detection means from the target temperature fulfills a predetermined condition.

In the fourth method, the relationship between the target temperature of the water mixture and the pre-load is previously stored. At a start of water mixture spouting, a pre-load of the first spring and/or the second spring is adjusted to be set equal to an initial value corresponding to a target temperature according to the relationship previously stored. After setting the pre-load, the actual temperature of water mixture is detected. When the detected temperature deviates from the target temperature, the pre-load of the first spring and/or the second spring is adjusted to compensate for the deviation. When the deviation of the detected temperature from the target temperature fulfills a predetermined condition, the stored relationship is updated with a new set of values of the target temperature and the pre-load.

The fourth method of the invention updates the stored relationship with a new set of values of the target temperature and the pre-load when the deviation of the actual temperature of water mixture from the target temperature fulfills a predetermined condition. A pre-load is set equal to an initial value corresponding to the target temperature based on the relationship thus updated. This allows an adequate pre-load to be set with respect to the varied spring characteristics of the first spring. This also allows setting of an adequate pre-load even if there is a season-oriented variation in the cold water supply temperature and the hot water supply temperature or a time-based change of the spring constant of the first spring or the second spring. The method further controls the temperature of water mixture using the first spring, which is composed of a material that varies the spring constant according to a temperature change in a predetermined temperature range. When an equilibrium of spring forces of the first spring and the second spring at a certain temperature deviated from the target temperature causes a deviation of the actual temperature of the water mixture from the target temperature, the pre-load of the first spring and the second spring is controlled to compensate for the deviation and keep the temperature of the water mixture sufficiently close to the target temperature.

The instant invention is also directed to a fifth method of mixing hot water with cold water, by regulating a mixing ratio of hot water to cold water based on a position of a movable valve disc disposed in a mixing valve, the position of the movable valve disc being determined by:

pressing the movable valve disc with a first spring in a predetermined first direction for reducing the mixing ratio of hot water to cold water in response to an increase in a temperature of the water mixture of hot water and cold water flowing out of the mixing valve, the first spring being composed of a material which varies a spring constant of the first spring according to a temperature variation in a predetermined temperature range; and pressing the movable valve disc with a second spring in a predetermined second direction opposite to the predetermined first direction, the method further comprising the steps of:
(a) storing a plurality of relationships between a pre-load and a target temperature of the water mixture;
(b) selecting one relationship, based on inputs of predetermined data, among the plurality of relations between the pre-load and the target temperature stored in the step (a); and
(c) adjusting the pre-load of the first spring and/or the second spring to set the pre-load equal to an initial value corresponding to a target temperature, based on the relationship selected in the step (b).

In the fifth method, a plurality of relationships between the target temperature of the water mixture and the pre-load are stored previously. One of the plural relationships between the target temperature and the pre-load is selected according to inputs of predetermined data. At a start of water mixture spouting, the pre-load of the first spring and/or the second spring is adjusted to be set equal to an initial value corresponding to a target temperature.

According to the fifth method of the invention, one of the plural relationship between the target temperature and the pre-load is selected according to inputs of predetermined data, and a pre-load equal to an initial value corresponding to a target temperature based on the selected relationship is set. This method easily sets the pre-load equal to an adequate initial value according to the cold water supply temperature and the hot water supply temperature, and allows the temperature of the water mixture to approach the target temperature quickly. The method also controls the temperature of the water mixture using the first spring, which is composed of a material that varies the spring constant according to a temperature change in a predetermined temperature change.

These and other objects, features, aspects, and advantages of the present invention will become more apparent from the following detailed description of the preferred embodiments that are illustrated in the accompanying drawings.

BRIEF DESCRIPTION OF THE DRAWINGS

FIG. 12 is a block diagram of the electrical structure of a control system that includes a CPU 150a;

DESCRIPTION OF THE EMBODIMENT

Figure 1:
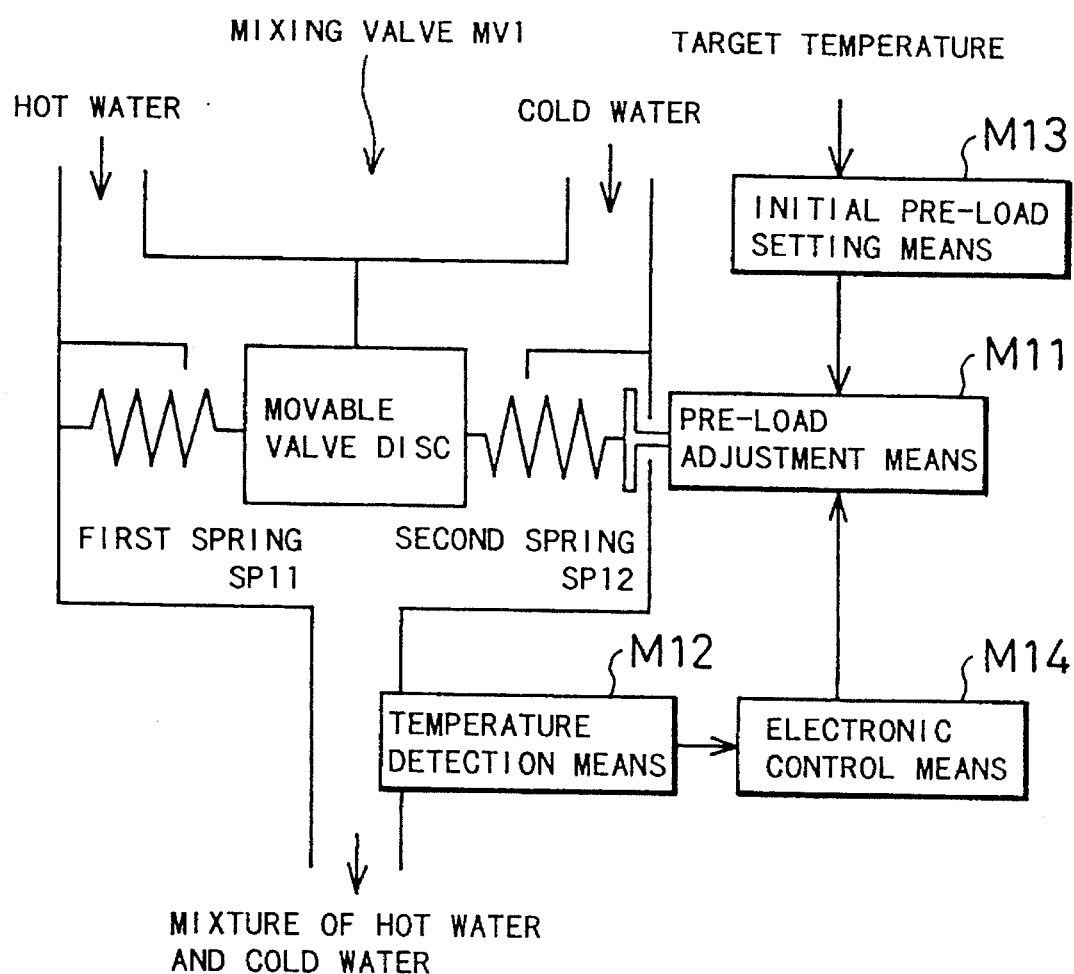
FIG. 1 is a block diagram illustrating essential structure of a first combination faucet according to the invention.
Figure 2:
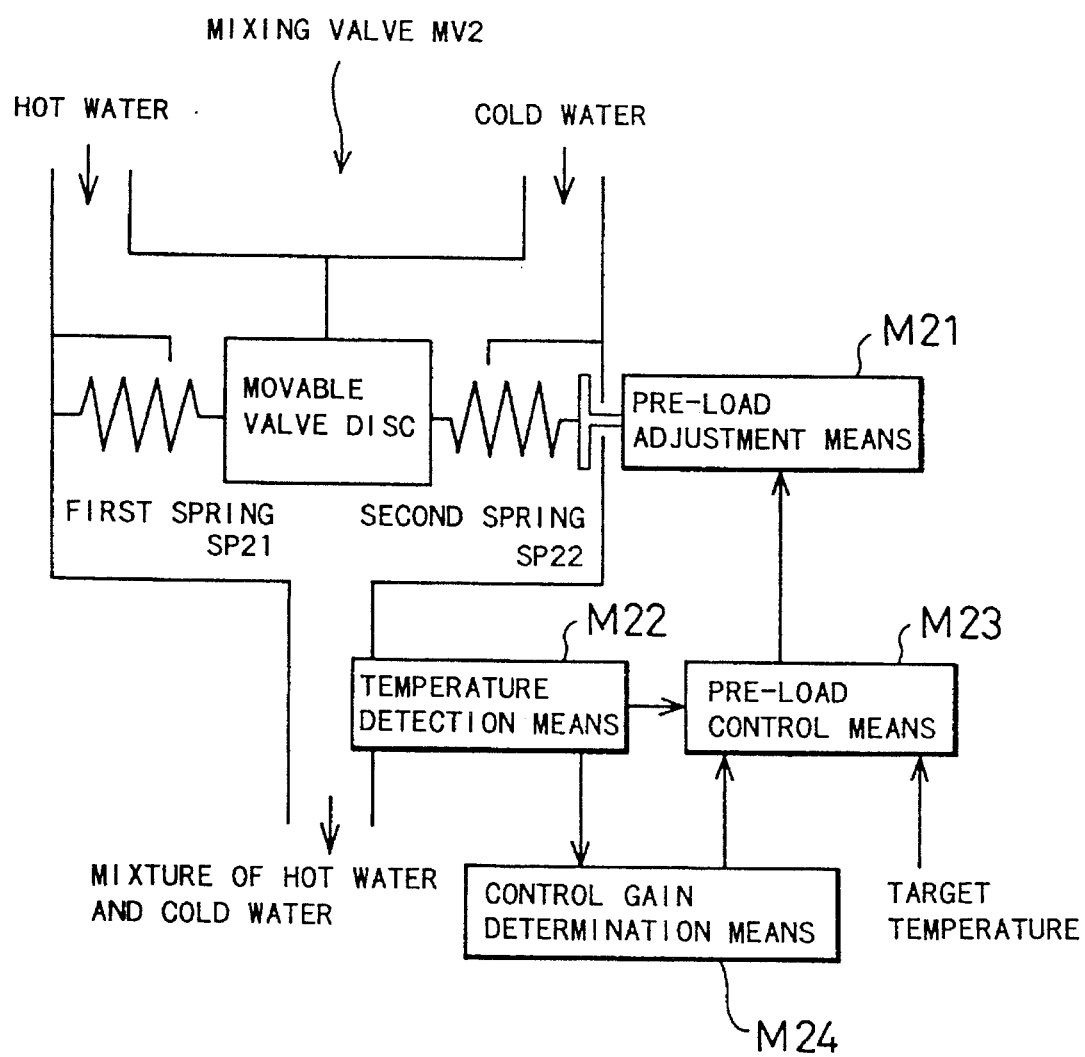
FIG. 2 is a block diagram illustrating essential structure of a second combination faucet according to the invention.
Figure 3:
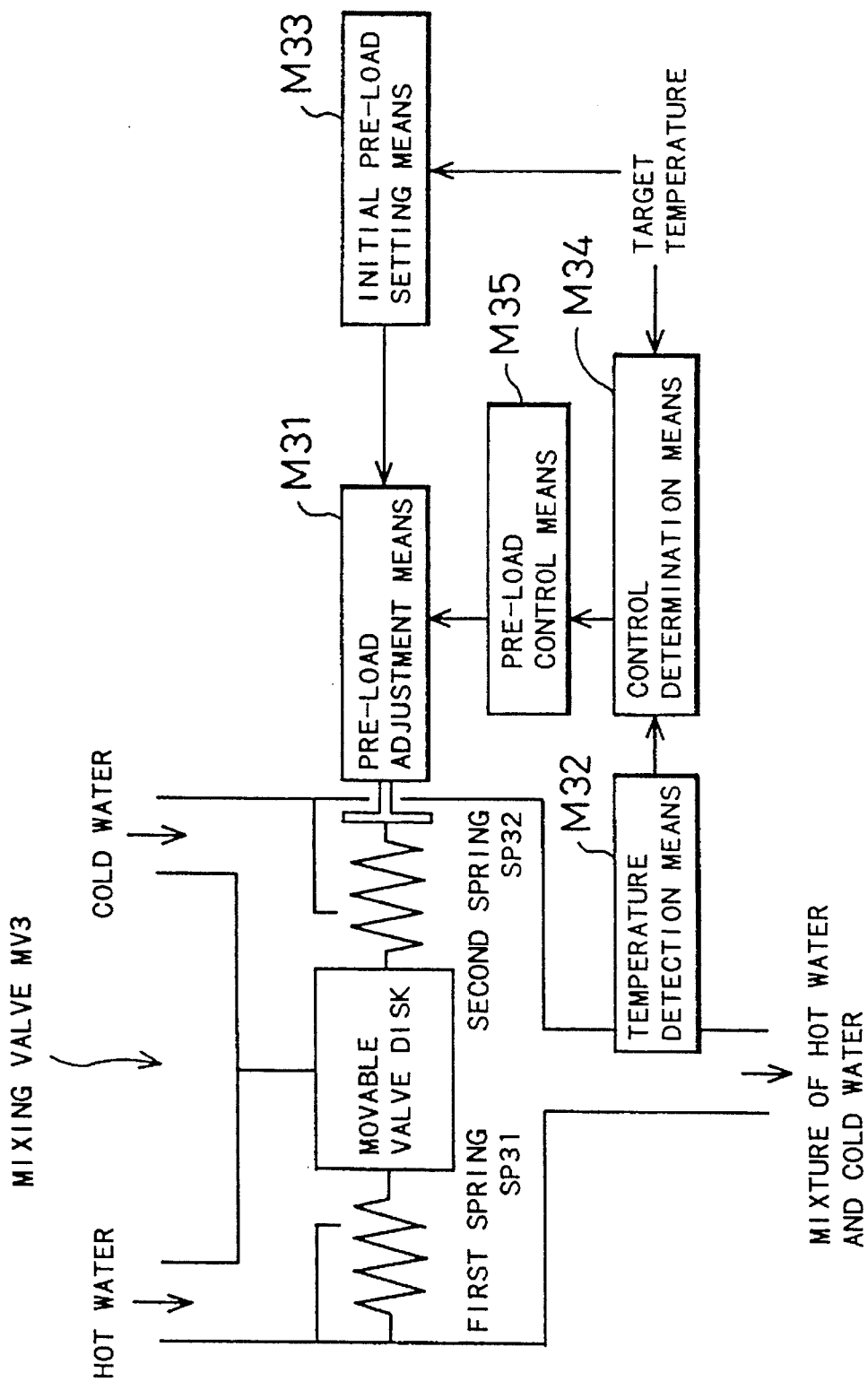
FIG. 3 is a block diagram illustrating essential structure of a third combination faucet according to the invention.
Figure 4:
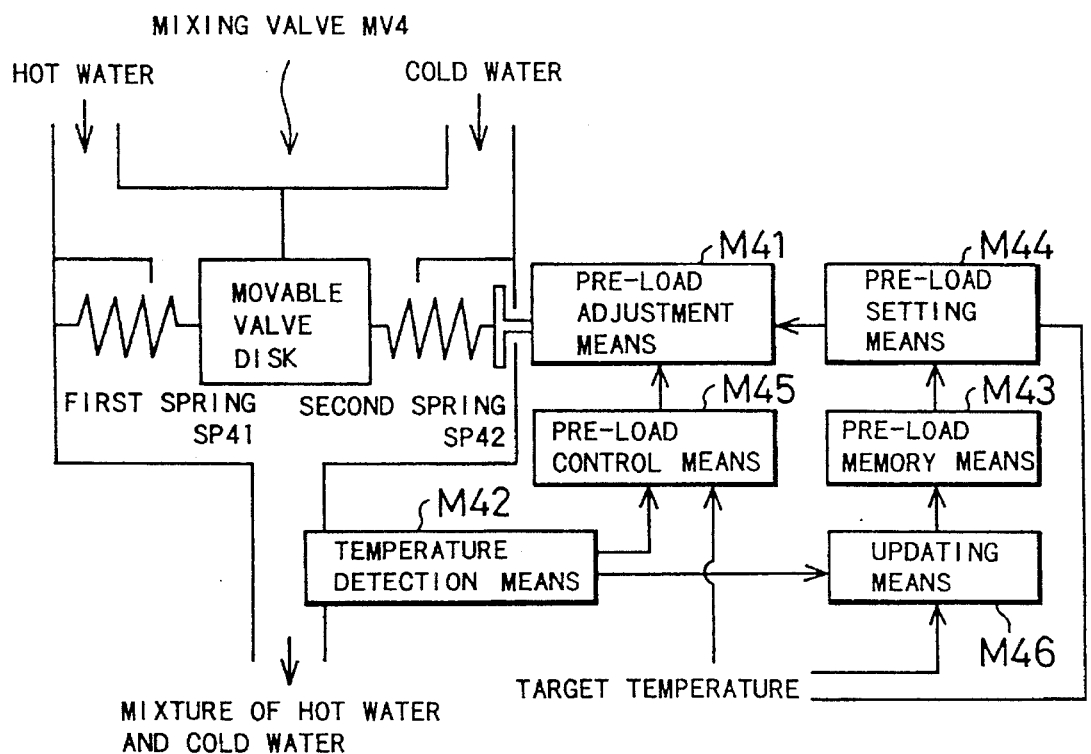
FIG. 4 is a block diagram illustrating essential structure of a fourth combination faucet according to the invention.
Figure 5:
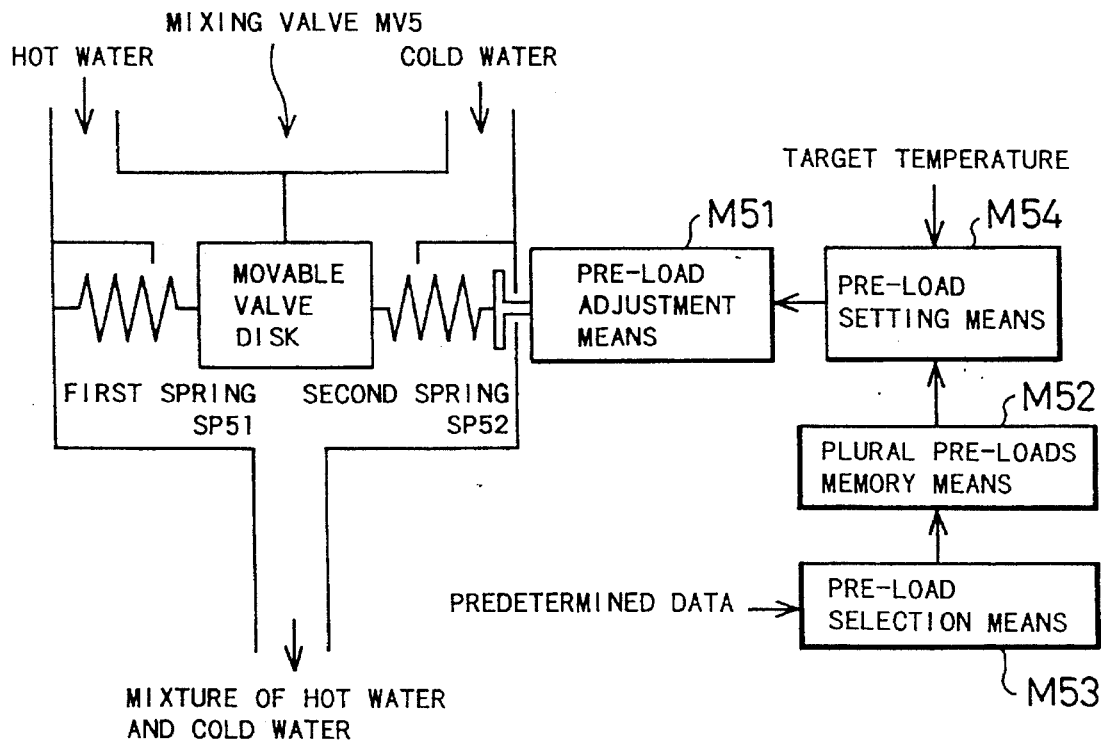
FIG. 5 is a block diagram illustrating essential structure of a fifth combination faucet according to the invention.
Figure 6:
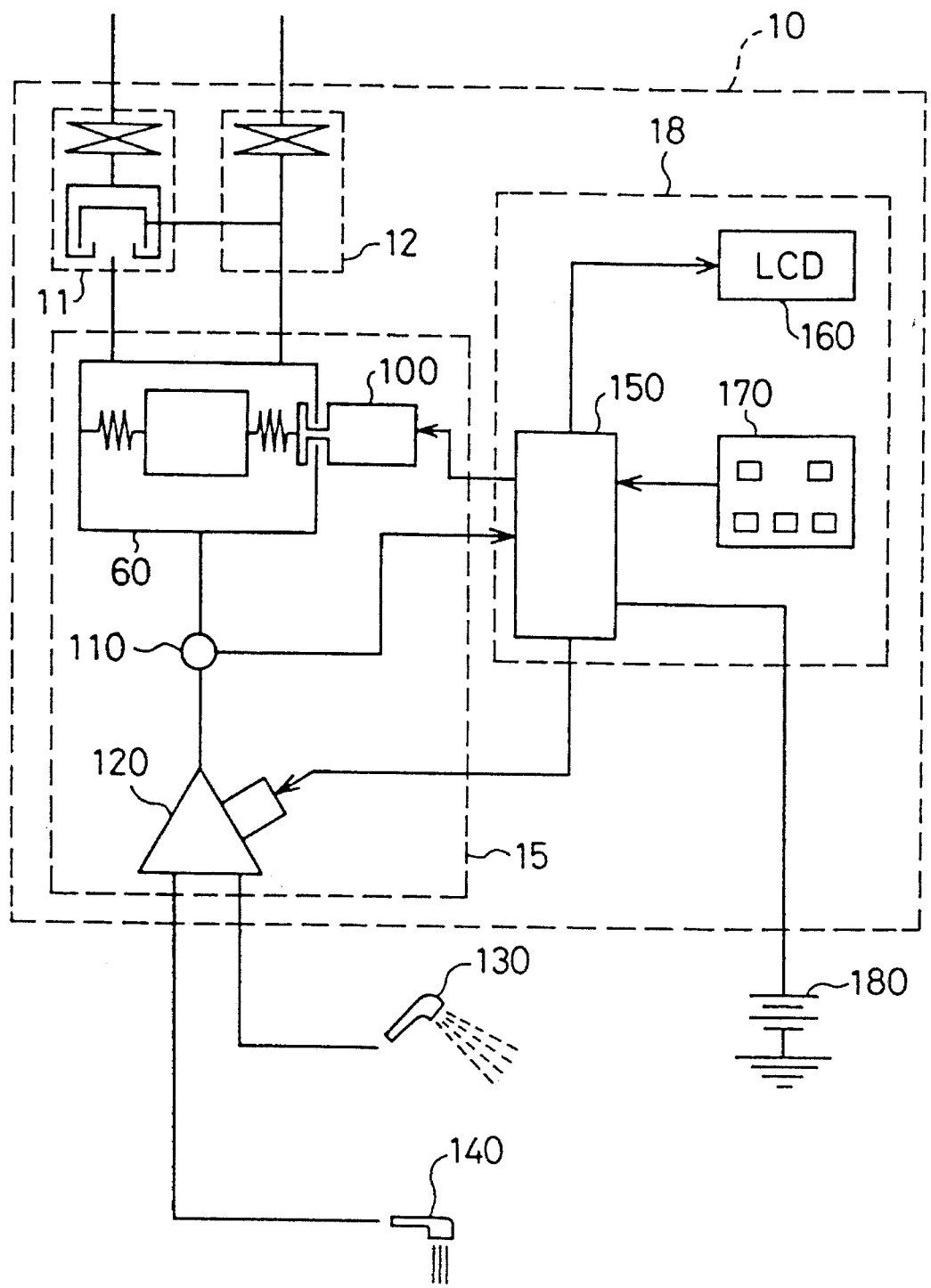
FIG. 6 is a schematic of a combination faucet 10 embodying the invention.
Figure 7:
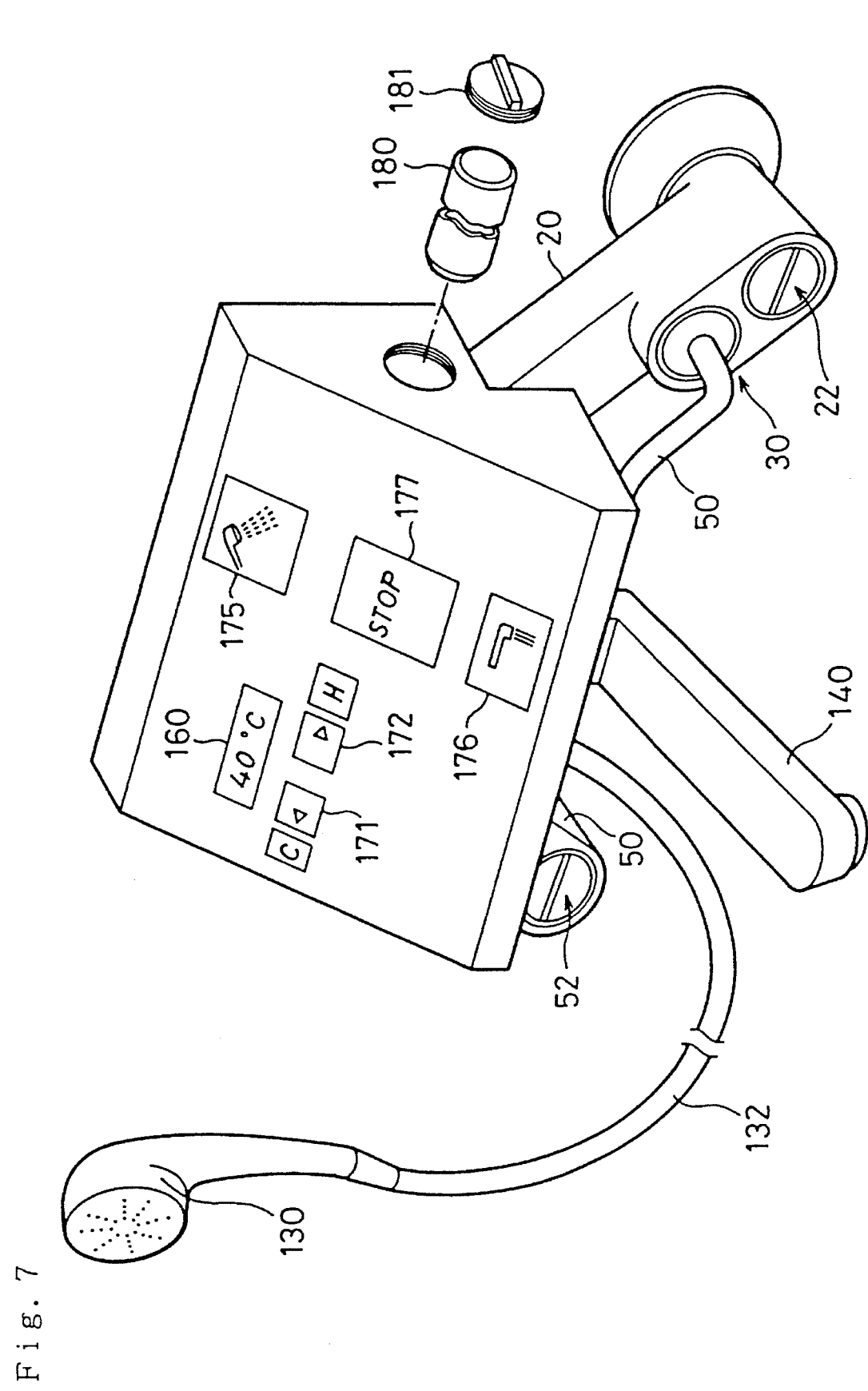
FIG. 7 is a perspective view of a physical structure embodying the combination faucet 10 of FIG. 6.

Now referring to the drawings and more particularly to FIGS. 6 and 7 thereof. The combination faucet 10 includes a cold water supply unit 11 for receiving cold water supplied through a water pipe (not shown), a hot water supply unit 12 for receiving hot water supplied from a water heater (not shown), a valve unit 15 for mixing hot water with cold water, and a control unit 18 for electrically controlling a mixing ratio of hot water to cold water. The valve unit 15 functionally includes a mixing valve 60 for mixing cold water supplied from the cold water supply unit 11 with hot water supplied from the hot water supply unit 12, a pre-load adjustment mechanism 100 for adjusting the position of a cylindrical movable valve member 70 constituted by a disc that is axially elongated along is periphery. Movable valve member 70 is incorporated in the mixing valve 60, and unit 15 also includes a temperature sensor 110 for detecting a temperature TC of water mixture of hot water and cold water, and a switch/stop valve 120 for selecting either a shower 130 or a faucet 140 for the flow of water mixture and stopping the flow of water mixture. Concrete structures of these elements will be described later. The control unit 18 includes a liquid crystal display (LCD) 160 for displaying a target temperature TP, a panel controller 170 for setting the target temperature TP and selecting either the shower 130 or the faucet 140 through which water mixture runs, and an electronic control unit 150 for receiving temperature signals detected by the temperature sensor 110 as well as signals input from the panel controller 170 and generating output signals to the pre-load adjustment mechanism 100, the switch/stop valve 120, and the LCD 160. The combination faucet 10 is connected to a battery 180 which supplies an electric power to each element of the combination faucet 10.

Referring to FIG. 7, the panel controller 170 of the control unit 18 includes a decrement switch 171 for decreasing the target temperature TP displayed on the LCD 160, an increment switch 172 for increasing the target temperature TP, a shower selection switch 175 for selecting the shower 130 to allow the flow of water mixture therefrom, a faucet selection switch 176 for selecting the faucet 140 to allow the flow of water mixture therefrom, and a stop switch 177 for stopping the flow of water mixture.

Figure 8:
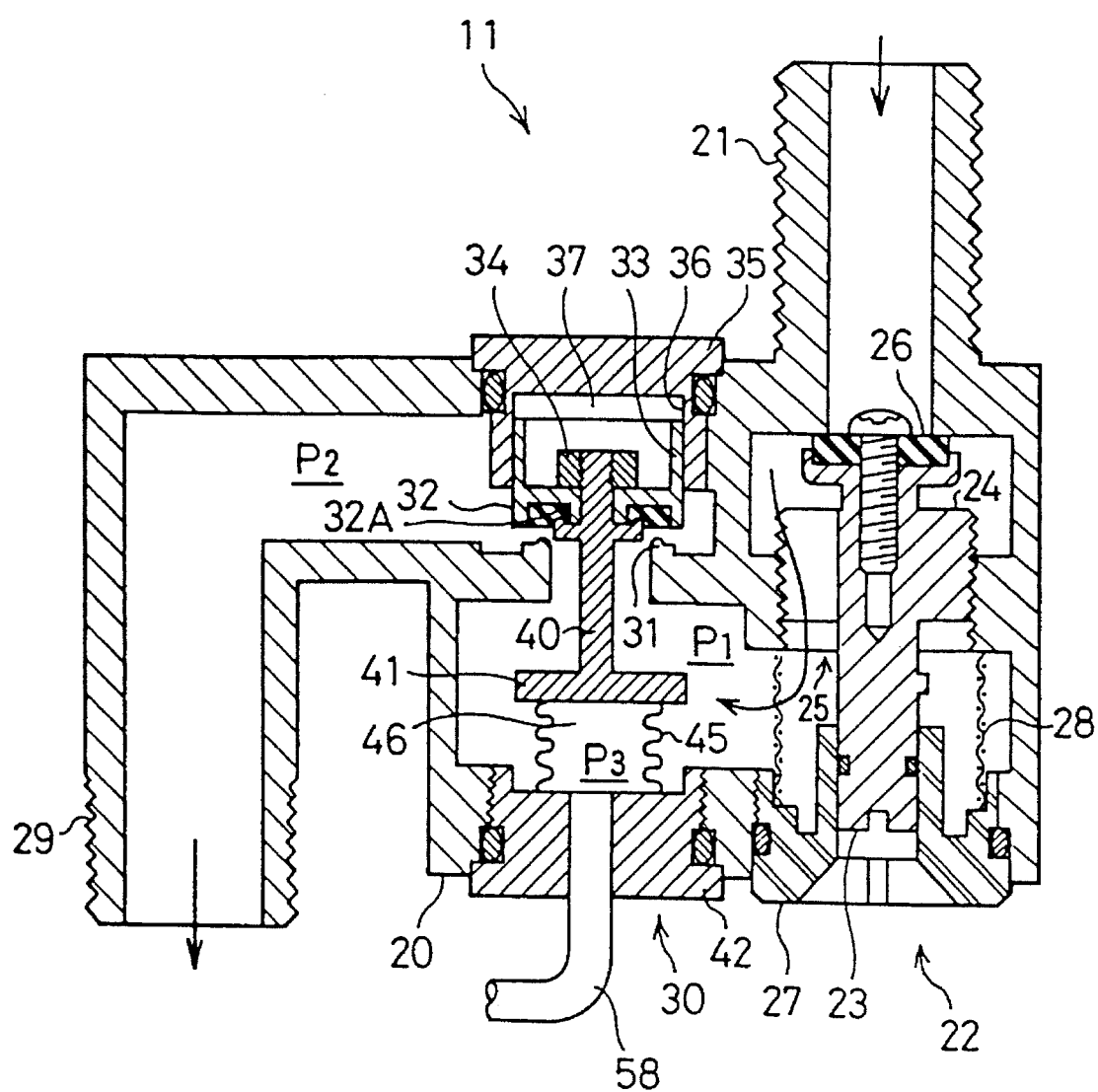
FIG. 8 is a cross sectional view of a cold water supply unit 11 included in the combination faucet 10.

The cold water supply unit 11 (FIG. 8) includes a housing 20 having an inlet 21 connecting with a water pipe (not shown) and an outlet 29 connecting with the mixing valve 60. A stop valve 22 and a pressure control valve 30 are integrated into the housing 20.

The stop valve 22 includes a cap 27 liquid-tightly fixed to the housing 20, a valve rod 23 guided by the cap 27 and the housing 20, and a strainer 28. The valve rod 23 has a guide element 24 engaging with the housing 20 and an end portion 26. The guide element 24 is provided with an opening 25 which forms a conduit for cold water. The guide element 24 engages with the housing 20 via a male/female screw structure. A rotation of the valve rod 23 around a rotational axis displaces the valve rod 23 in the direction of the rotational axis (upward or downward in FIG. 8). A rotation of the valve rod 23 accordingly makes the end portion 26 attach to or detach from the housing 20 to stop or allow the flow of cold water. Under the detachment conditions, cold water flows through a clearance between the end portion 26 and the housing 20, runs through the opening 25, passes through the strainer 28 for removal of particles or solid substances, and flows into the pressure control valve 30.

The pressure control valve 30 controls a pressure of cold water applied to the valve unit 15. The pressure control valve 30 includes a ring-shaped valve seat 31 formed in the housing 20, a valve member 32 cooperating with the valve seat 31 in controlling the flow of cold water, a guide member 35 for receiving the valve member 32 to allow a sliding movement of the valve member 32, a valve shaft 40 fixed to the valve member 32, and a metal bellows 45 for supporting one end of the valve shaft 40. The valve member 32 further includes a main body 32A where the valve shaft 40 is fixed with a nut 34, and a cylindrical skirt 33 extending in a direction opposite to the valve seat 31. The skirt 33 is received via a small clearance in a bore 36 of the guide member 35 liquid-tightly fixed to the housing 20. A secondary water supply pressure P2 down the valve seat 31 is applied into a secondary pressure chamber 37 defined by the valve member 32 and the guide member 35.

The valve shaft 40 is fixed to the valve member 32 on one end has a spring bearing 41 on the other end thereof. A cap 42 facing the spring bearing 41 is liquid-tightly fixed to the housing 20. The metal bellows 45 is liquid-tightly interposed between the spring bearing 41 and the cap 42 to form a back pressure chamber 46. The metal bellows 45 formed as a spring having a steady spring constant is set to have an effective pressure-receiving area identical with an effective area of the valve seat 31. A hot water supply pressure P3 from the water heater is applied into the back pressure chamber 46 via a pressure conduit 58 connecting with the hot water supply unit 12.

The pressure control valve 30 thus constructed works in the following manner. The valve member 32 receives a force acting in a valve-opening direction by a primary water supply pressure P1 as well as a force acting in a valve-closing direction by the secondary water supply pressure P2 in the secondary pressure chamber 37. The spring bearing 41, on the other hand, receives a force acting in the valve-closing direction by the primary water supply pressure P1, a spring force acting in the valve-opening direction by the metal bellows 45, and a force acting in the valve-opening direction by the hot water supply pressure P3 in the back pressure chamber 46. Since the valve member 32 is joined with the spring bearing 41 via the valve shaft 40, the force acting in the valve-opening direction by the primary water supply pressure P1 and applied to the valve member 32 virtually balances with the force acting in the valve-closing direction by the primary water supply pressure P1 and applied to the spring bearing 41. The force acting in the valve-closing direction by the secondary water supply pressure P2 in the secondary pressure chamber 37 balances with a combined force of the spring force acting in the valve-opening direction by the metal bellows 45 and the force acting in the valve-opening direction by the hot water supply pressure P3 in the back pressure chamber 46. The secondary water supply pressure P2 is accordingly higher than the hot water supply pressure P3 by the spring force of the metal bellows 45. A variation in the primary water supply pressure P1 from the water pipe or in the hot water supply pressure P3 from the water heater thereby does not affect a difference between the secondary water supply pressure P2 and the hot water supply pressure P3 but keeps the difference unchanged.

The hot water supply unit 12 has a structure similar to that of the cold water supply unit 11 and is thus not illustrated herein. The hot water supply unit 12 includes a stop valve 52 working in the same manner as the stop valve 22 of the cold water supply unit 11.

Figure 9:
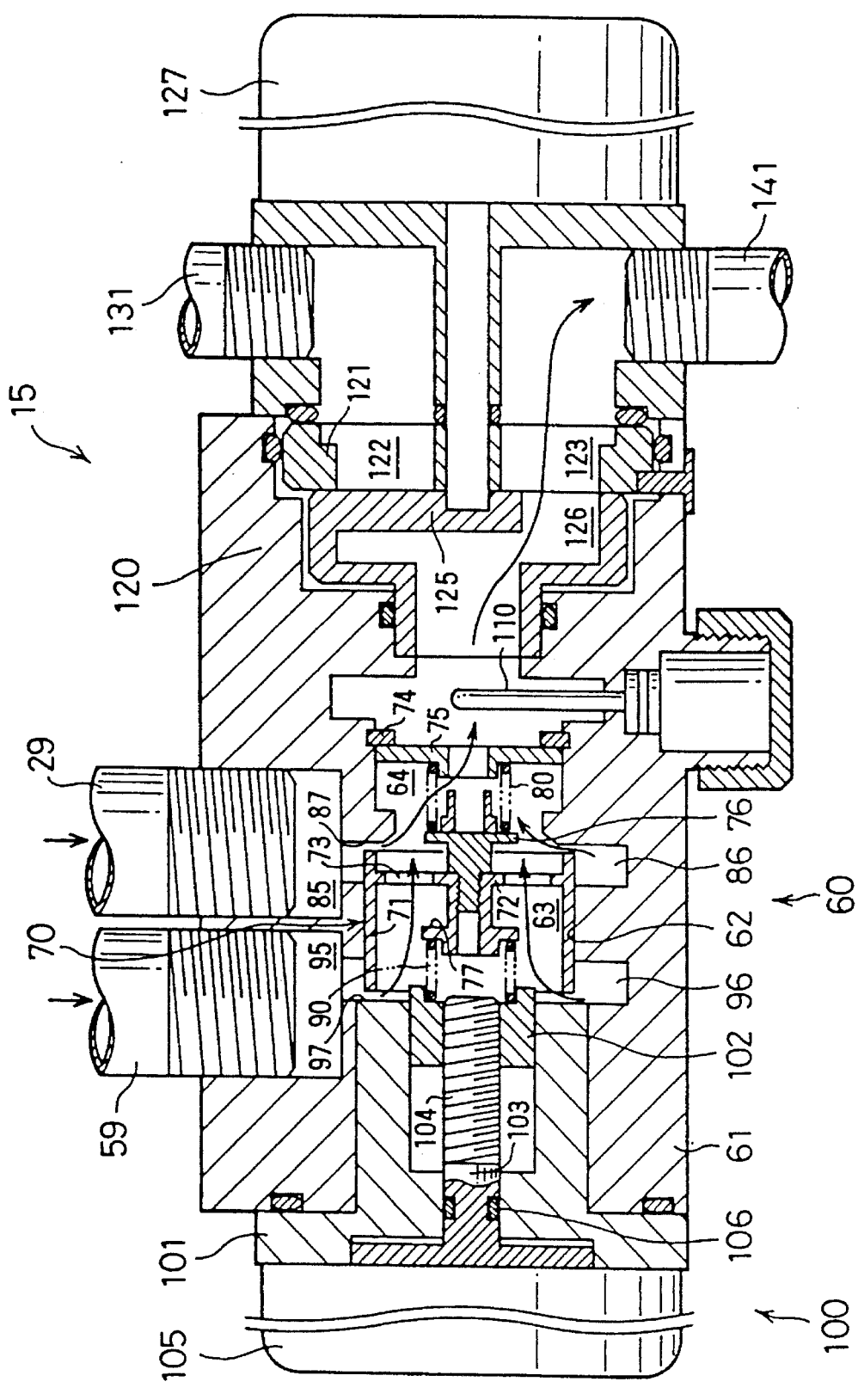
FIG. 9 is an enlarged cross sectional view of a valve unit 15 included in the combination faucet 10.

A typical structure of the mixing valve unit 15 is described according to the enlarged cross sectional view of FIG. 9. The valve unit 15 has a housing 61 which receives the mixing valve 60, the pre-load adjustment mechanism 100, the temperature sensor 110, and the switch/stop valve 120 therein. The housing 61 has a cold water inlet 85 connecting with the outlet 29 of the cold water supply unit 11 and a hot water inlet 95 connecting with an outlet 59 of the hot water supply unit 12.

The mixing valve 60 includes circular conduits 86 and 96 respectively connected to the cold water inlet 85 and the hot water inlet 95, a valve chest 63 for receiving the movable valve cylinder 70 to allow a sliding movement of the movable valve cylinder 70 along an axis (leftward and rightward in FIG. 9), and a mixing chamber 64. The valve chest 63 is defined by a cold water valve seat 87 and a hot water valve seat 97 disposed perpendicularly to the axis of the mixing valve 60 as well as an axial bore 62. The movable valve cylinder 70 includes a cylindrical element 71 and a radial web 72. There is a small clearance between an outer diameter of the cylindrical element 71 and an inner diameter of the bore 62. The web 72 of the movable valve cylinder 70 has a plurality of openings 73. Hot water supplied from the hot water inlet 95 into the valve chest 63 flows through the plurality of openings 73 into the mixing chamber 64 to be mixed with cold water. A mixing ratio of hot water to cold water is determined by a displacement of the movable valve cylinder 70 in its axial direction. When the movable valve cylinder 70 is displaced to a predetermined first position to engage with the cold water valve seat 87 and shut off the flow of cold water, the mixing valve 60 supplies only hot water. When the movable valve cylinder 70 is displaced to a predetermined second position to engage with the hot water valve seat 97 and shut off the flow of hot water, on the contrary, the mixing valve 60 supplies only cold water.

The position of the movable valve cylinder 70 is determined according to equilibrium of forces of a temperature-sensitive coil spring 80 disposed in the mixing chamber 64 and a second coil spring 90 disposed in the valve chest 63. One end of the temperature-sensitive coil spring 80 is supported by a first spring bearing 75 fixed to the housing 61 with a snap ring 74 whereas the other end of the temperature-sensitive coil spring 80 is supported by a second spring bearing 76 fixed to and axially aligned with the movable valve cylinder 70. The second coil spring 90 has one end supported by a third spring bearing 77 formed integrally in cooperation with the movable valve cylinder 70 and the other end supported by a movable spring bearing 102 of the pre-load adjustment mechanism 100. For the simplified assembly, the second spring bearing 76 runs through the web 72 and is axially aligned with the third spring bearing 77.

The temperature-sensitive coil spring 80 is composed of a metal having a spring constant varied according to the temperature while the second coil spring 90 is composed of a conventional spring material having a spring constant unchanged with respect to the temperature. Examples of the metal having the spring constant varied with the temperature include shape memory alloys (SMA) of nickel and titanium. Such a SMA has a modulus of elasticity varied with the temperature, and the spring constant of the temperature-sensitive coil spring 80 composed of the SMA is accordingly varied depending upon the temperature. Commercially available SMAs, for example, 'KTS-SM alloy' manufactured by Kanto Steel Co., Ltd., may be used for the temperature-sensitive coil spring 80 having desirable temperature responsiveness and characteristics.

Adequate setting of the spring constant and the pre-load of the temperature-sensitive coil spring 80 gives a sufficiently small spring force (load), thereby saving the power of the battery 180 from being consumed by the pre-load adjustment mechanism 100. Under low-temperature conditions for giving the flow of cold water, the temperature-sensitive coil spring 80 is required to generate a sufficient spring force which effectively presses the movable valve cylinder 70 to the left with respect to FIG. 9, against the hot water valve seat 97 to shut off the flow of hot water. Under the low-temperature conditions, a pre-load applied to the second coil spring 90 is set equal to zero, and the movable valve cylinder 70 is pressed towards the hot water valve seat 97 only by the spring force of the temperature-sensitive coil spring 80. The spring constant and the pre-load of the temperature-sensitive coil spring 80 are accordingly determined to allow the temperature-sensitive coil spring 80 to have a spring force of not greater than 500 grams or more preferably of not greater than 300 grams at low-temperatures, for example, at a water supply temperature T2 of 5° C.

The pre-load adjustment mechanism 100 varies the pre-load of the second coil spring 90 in response to a rotation of a pre-load adjustment motor 105. The movable spring bearing 102 is fitted via a spline structure into an end member 101 liquid-tightly fixed to the housing 61, in such a manner that allows a displacement of the movable spring bearing 102 along an axis and prevents a rotation thereof around the axis. A worm 104 formed on an output shaft 103 of the pre-load adjustment motor 105 engages with an inner screw of the movable spring bearing 102. The output shaft 103 of the pre-load adjustment motor 105 is fixed with an O ring 106.

The pre-load adjustment mechanism 100 thus constructed increases the pre-load of the second coil spring 90 by rotating the pre-load adjustment motor 105 in a predetermined direction to displace the movable spring bearing 102 rightward in FIG. 9, and decreases the pre-load of the second coil spring 90 by rotating the pre-load adjustment motor 105 in an opposite direction to displace the movable spring bearing 102 leftward in FIG. 9.

The temperature sensor 110 is disposed downstream of the first spring bearing 75, that is, at an outlet of the mixing valve 60, to allow a temperature sensitive element of the temperature sensor 110 to be in direct contact with water mixture flown from the mixing valve 60. The temperature sensor 110 is liquid-tightly fixed to the housing 61.

Figure 10:
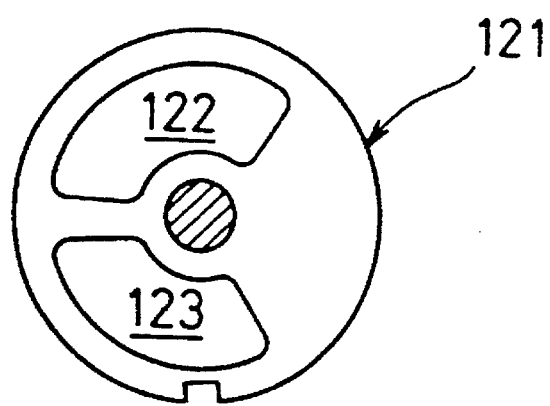
FIG. 10 is a plan view of a fixed disc 121 incorporated in the switch/stop valve 120 in FIG. 9.
Figure 11:
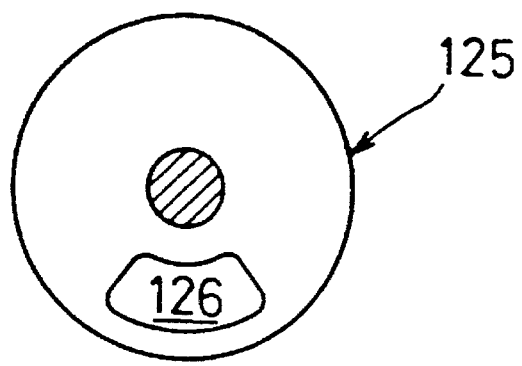
FIG. 11 is a plan view of a rotational disc 125 incorporated in the switch/stop valve 120 in FIG. 9.

The switch/stop valve 120 is disposed further downstream than the temperature sensor 110. The switch/stop valve 120 includes a fixed disc 121 fixed to the housing 61, a rotational disc 125 rotating while sliding against the fixed disc 121, and a switch/stop motor 127 for driving and rotating the rotational disc 125. Referring to FIG. 10, the fixed disc 121 has first and second spout ports 122 and 123. The first spout port 122 is connected to the shower 130 via a fitting 131 and a shower hose 132 (see FIG. 7) whereas the second spout port 123 is connected to the faucet 140 via a fitting 141 and a swivel joint (not shown). Referring to FIG. 11, the rotational disc 125 has only one spout port 126 connecting with the mixing chamber 64 of the mixing valve 60. When the spout port 126 of the rotational disc 125 is connected to the first spout port 122 of the fixed disc 121 by rotating the switch/stop motor 127 in a predetermined direction, water mixture of cold water and hot water is supplied to the shower 130. When the spout port 126 is connected to the second spout port 123 of the fixed disc 121 by rotating the switch/stop motor 127 in an opposite direction, on the contrary, water mixture is supplied to the faucet 140. When the spout port 126 is disconnected from both the first spout port 122 and the second spout port 123 of the fixed disk 121, the flow of water mixture is shut off.

Figure 12:
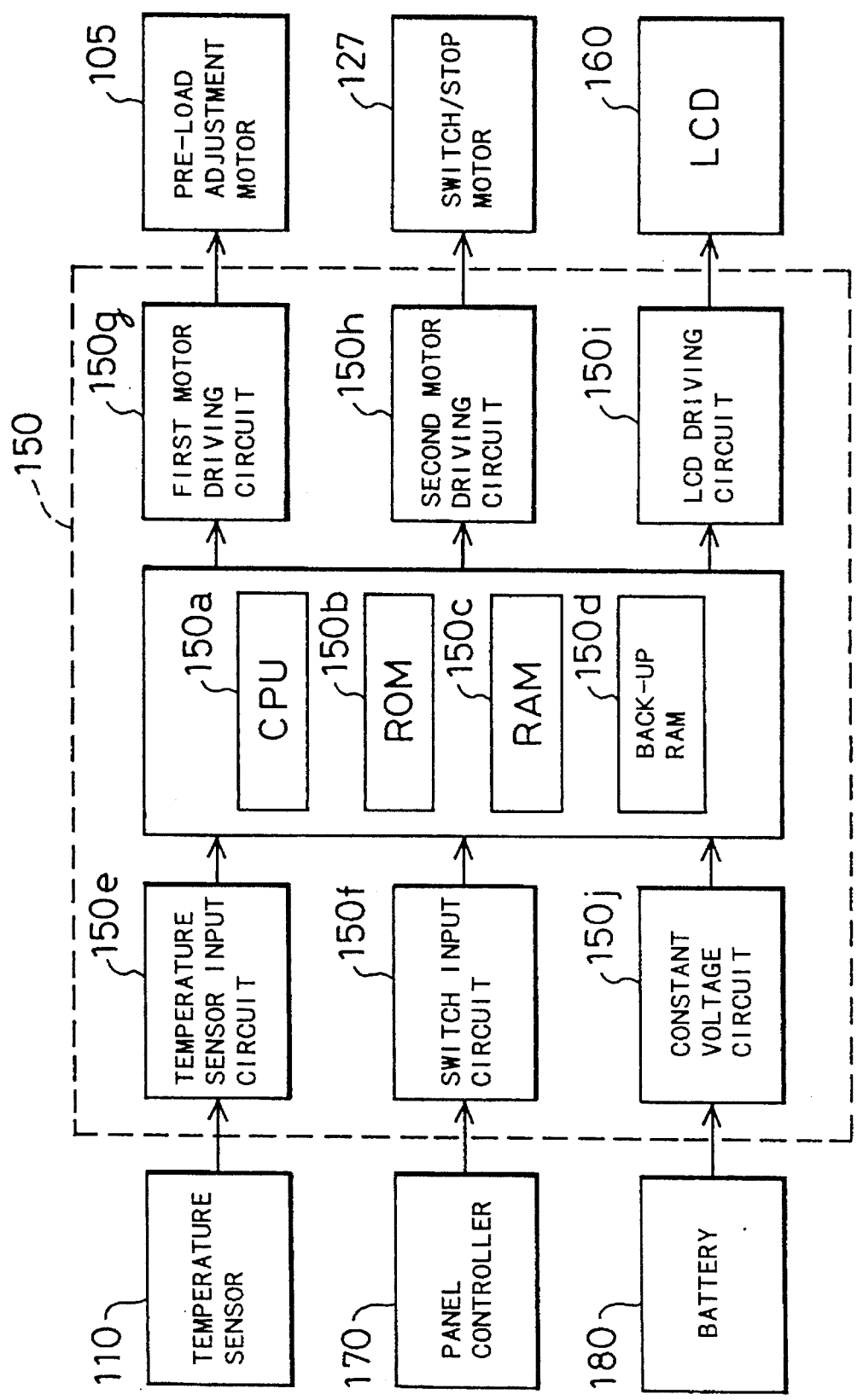

The electronic control unit 150 of the control unit 18 is constructed as a logical operations circuit including a microcomputer as shown in FIG. 12. The electronic control unit 150 includes a CPU 150a for executing a variety of operations to control the spout of water mixture according to pre-set control programs, a ROM 150b for storing the control programs and various control data required for execution of the various operations by the CPU 150a, and a RAM 150c where a variety of data required for execution of the various operations by the CPU 150a are temporarily written into or read from. The electronic control unit 150 further includes a back-up RAM 150d for maintaining data under the power-off conditions, a temperature sensor input circuit 150e for receiving signals from the temperature sensor 110, a switch input circuit 150f for receiving switch signals from the panel controller 170, and a first motor driving circuit 150g for outputting driving signals to the pre-load adjustment motor 105 based on the results of the operations by the CPU 150a. The electronic control unit 150 is also provided with a second motor driving circuit 150h for outputting driving signals to the switch/stop motor 127 based on an input from the shower selection switch 175, the faucet selection switch 176 or the stop switch 177, an LCD driving circuit 150i for outputting display signals to the LCD 160, and a constant-voltage circuit 150j connecting with the battery 180.

Figure 13:
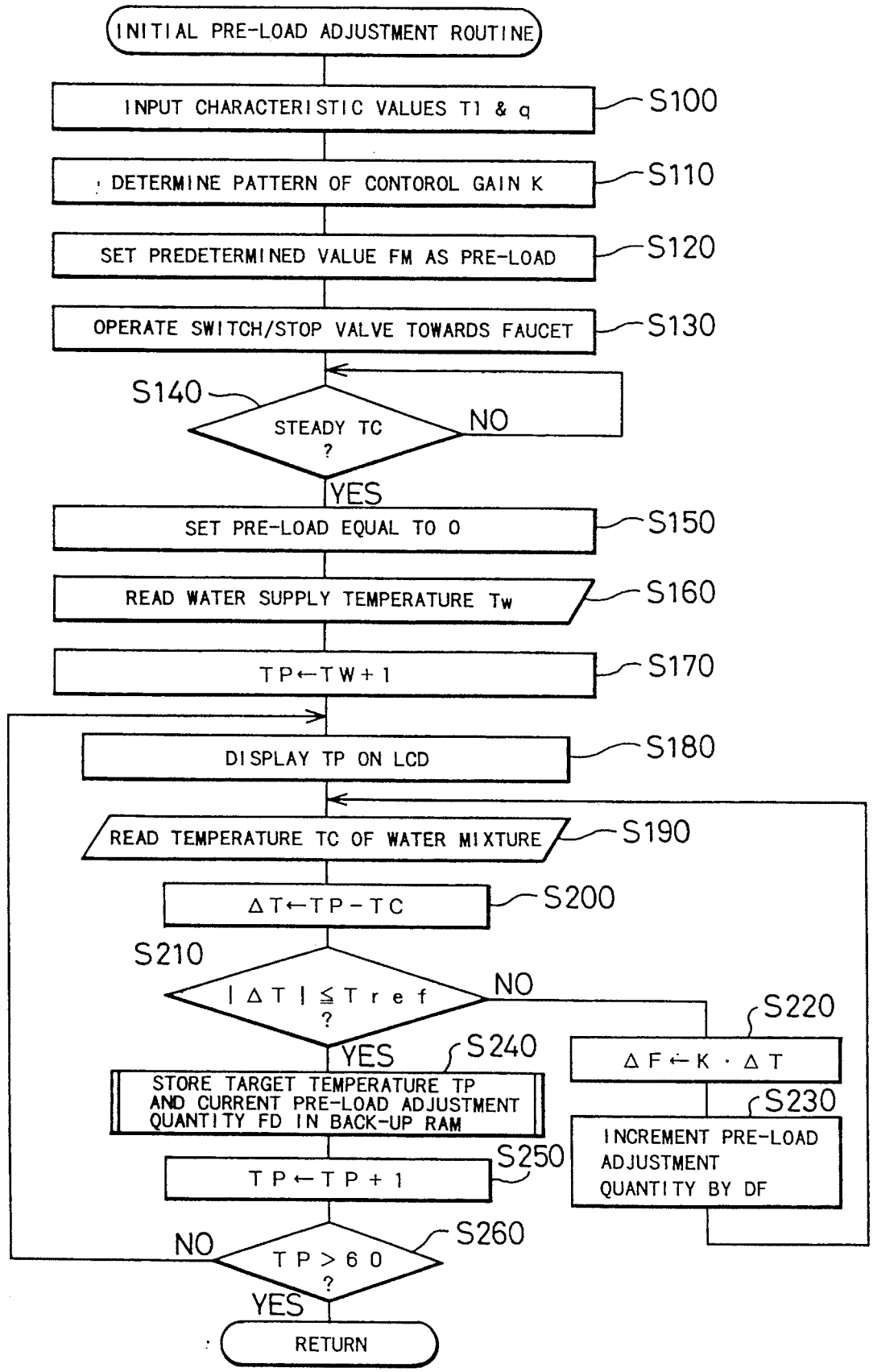
FIG. 13 is a flowchart of an initial pre-load adjustment routine executed by an electronic control unit 150.

Operations of the combination faucet 10 thus constructed are described according to the flowcharts. FIG. 13 is a flowchart showing an initial pre-load adjustment routine, which is executed by the electronic control unit 150 at the time of newly installing the combination faucet 10 or resuming the use of the combination faucet 10 after a long interval.

Figure 14A:
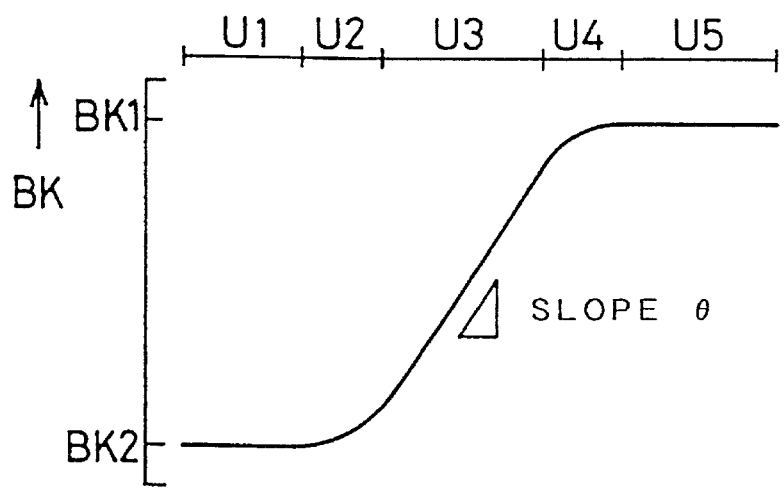
FIGS. 14(a), 14(b) and 14(c) are graphs respectively showing the relationship between the temperature T and the spring constant BK, the variation of the spring constant ΔBK, and the control gain K of a temperature-sensitive coil spring 80.
Figure 14B:
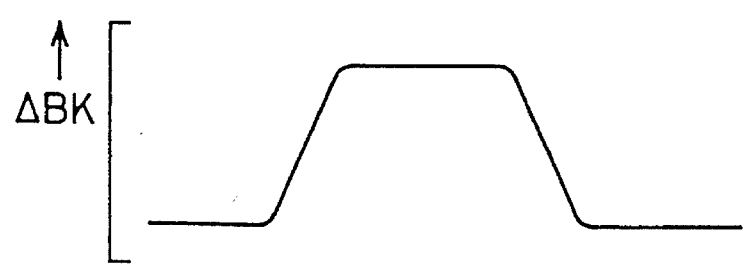
Figure 14C:
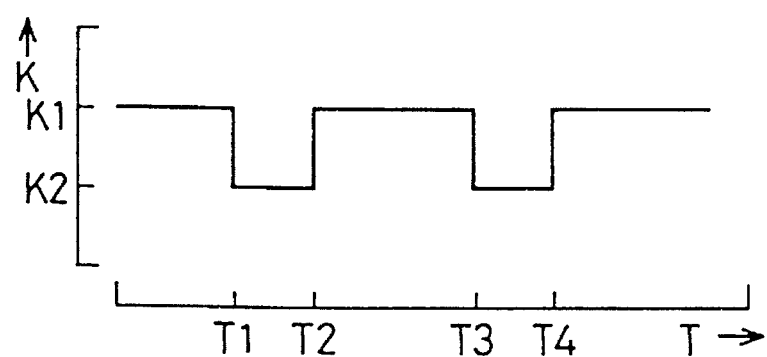

At step S100 a user inputs characteristic values T1 and θ representing spring characteristics of the temperature-sensitive coil spring 80 (See FIGS. 14(a)14(c). The characteristic value T1 represents a temperature at which a spring constant BK of the temperature-sensitive coil spring 80 starts variation in response to a temperature increase. The characteristic value θ represents a slope of a variation in the spring constant BK which is substantially proportional to the temperature increase.

The spring constant BK of the temperature-sensitive coil spring 80 shows a first constant value BK2 in a section U1 where a temperature T is less than T1 and a second constant value BK1 in a section U5 where the temperature T is not less than T4. The spring constant BK is varied with the temperature TC of water mixture in a temperature range of T1 to T4, that is, in sections U2, U3, and U4. More specifically, in a temperature range from T2 to T3 (section U3), the spring constant BK shows a steady variation ΔBK and is proportional to the temperature increase with the slope θ. In a temperature range from T1 to T2 (section U2) and a temperature range from T3 to T4 (section U4), though the spring constant BK is varied with the temperature TC of water mixture, the variation ΔBK is not steady but smaller than the constant variation ΔBK in the section U3.

The spring characteristics of the temperature-sensitive coil spring 80 can be expressed by parameters of the temperatures T1, T2, T3, and T4 and the slope θ. More specifically, the spring characteristics of the temperature-sensitive coil spring 80 are determined according to the parameters of the temperature T1 and the slope θ. Inputs of the temperature T1 and the slope θ (characteristic values T1 and θ) determine the spring characteristics of the temperature-sensitive coil spring 80 used in the combination faucet 10.

At step S110, a pattern of a control gain K in feed-back control for keeping the temperature TC of water mixture close to a target temperature TP is determined by a map (not shown) representing the relationship between the characteristic values T1, θ and the pattern of the control gain K. In a certain temperature range, the variation ΔBK of the spring constant of the temperature-sensitive coil spring 80 changes in response to the temperature TC of water mixture and causes insufficient, undesirable control. In the combination faucet 10 of the embodiment, the control gain K is thus determined according to the variation ΔBK of the spring constant. FIGS. 14(b) and 14(c) respectively show the variation ΔBK of the spring constant and the control gain K plotted against the temperature T.

In the embodiment, the control gain K is set according to the variation ΔBK of the spring constant in the following manner. The control gain K is set equal to a predetermined first value K1 in the section U3 where the spring constant BK is proportional to the temperature T and equal to a predetermined second value K2, which is smaller than K1, in the sections U2 and U4 where the spring constant BK is not proportional to the temperature T and the variation ΔBK of the spring constant changes in response to the temperature. In the sections U1 and U5 where the spring constant BK is unchanged, the control gain K is set equal to the predetermined first value K1 as is the case of the section U3.

Such settings of the control gain K effectively prevent undesirable hunting and regulate the temperature TC of water mixture to be sufficiently close to the target temperature TP even when the target temperature TP is in the section U2 or U4. The variation ΔBK of the spring constant in the section U2 or U4 is smaller than the variation ΔBK in the section U3, and an action due to the variation in the spring constant BK against an identical temperature variation is accordingly smaller in the section U2 or U4 than in the section U3. Because of the smaller action due to the variation of the spring constant BK in the section U2 or U4, the variation in the temperature TC of water mixture is greater in the section U2 or U4 than in the section U3 with respect to a given driving amount of the pre-load adjustment motor 105 (actual pre-load adjustment quantity ΔF). When the predetermined first value K1 allowing adequate control in the section U3 is applied to the control gain K in the section U2 or U4, the actual pre-load adjustment quantity ΔF determined according to the control gain K becomes greater than an appropriate value, which causes undesirable hunting in a temperature range around the target temperature TP. For appropriate control in the section U2 or U4, the smaller control gain K should be set to reduce the actual pre-load adjustment quantity ΔF against a temperature deviation ΔT (described later).

In the section U1 or U5 where the spring constant BK is unchanged, the temperature is regulated not by the temperature-sensitive coil spring 80 but through the feed-back control. Although the control gain K in the section U1 or U5 is set equal to the predetermined first value K1 for the section U3 in the embodiment, it may be a smaller or greater value.

In this embodiment, the control gain K is set equal to either the predetermined first value K1 or the predetermined second value K2 according to the variation ΔBK of the spring constant. Another structure may, however, be applicable to determination of the control gain K. Possible examples include a structure wherein the control gain K is determined by multiplying the variation ΔBK by a proportional constant and another structure wherein the control gain K is determined by a three-dimensional map of the control gain K, the variation ΔBK of the spring constant, and the temperature TC of water mixture.

After determining the pattern of the control gain K at step S110, the program proceeds to step S120 at which the electronic control unit 150 reads a given value FM of a pre-load adjustment quantity FS previously stored in the ROM 150b, and drives the pre-load adjustment motor 105 to make the pre-load equal to the given value FM. The given value FM represents a pre-load for making a hot water opening substantially equal to a cold water opening, irrespective of the varied quality of the temperature-sensitive coil spring 80. The switch/stop valve 120 is actuated to allow the flow of water mixture from the faucet 140 at step S130. Water mixture is continuously flown from the faucet 140 until the temperature TC of the water mixture becomes constant at step S140. The processing of steps S130 and S140 spouts dead water stored in a cold water supply conduit and a hot water supply conduit (not shown). After completion of the spout, the pre-load is set equal to zero so as to shut off the flow of hot water and allow only the flow of cold water at step S150. The electronic control unit 150 then reads a water supply temperature Tw measured by the temperature sensor 110 at step S160, and determines a target temperature TP by adding the value '1' to the water supply temperature Tw at step S170.

After displaying the target temperature TP thus determined on the LCD 160 at step S180, the program goes to step S190 at which the electronic control unit 150 reads a temperature TC of water mixture measured by the temperature sensor 110. The electronic control unit 150 calculates a temperature deviation $\Delta T$ by subtracting the temperature TC of water mixture from the target temperature TP at step S200, and compares an absolute value of the temperature deviation $\Delta T$ with a threshold value Tref corresponding to a certain deviation at step S210. The threshold value Tref is a maximum allowable temperature deviation of the actual temperature TC of water mixture from the target temperature TP. The threshold value Tref is determined by a minimum driving control of the pre-load adjustment motor 105 and the characteristics of the temperature-sensitive coil spring 80.

When the absolute value of the temperature deviation $\Delta T$ is greater than the threshold value Tref, the program goes to step S220 at which an actual pre-load adjustment quantity $\Delta F$ is determined by multiplying the temperature deviation $\Delta T$ by the control gain K, which is determined according to the relationship between the variation $\Delta BK$ of the spring constant and the control gain K depending upon inputs of the characteristic values T1 and $\theta$. After a current pre-load adjustment quantity FD is incremented by the actual pre-load adjustment quantity $\Delta F$ at step S230, the program returns to step S190. The closed loop of steps S190 through S230 is repeated until the absolute value of the temperature deviation $\Delta T$ becomes equal to or less than the threshold value Tref.

When the absolute value of the temperature deviation $\Delta T$ is not greater than the threshold value Tref at step S210, the program proceeds to step S240 at which the electronic control unit 150 stores the target temperature TP and the current pre-load adjustment quantity FD into the back-up RAM 150d. The back-up RAM 150d has an area previously allocated to a map representing the relationship between the temperature TC of water mixture and the pre-load adjustment quantity FS. The target temperature TP and the current pre-load adjustment quantity FD are stored as data representing the relationship between the temperature TC of water mixture and the pre-load adjustment quantity FS.

The electronic control unit 150 increments the target temperature TP by one at step S250, and compares the target temperature TP with the value '60' at step S260. When the target temperature TP is not greater than the value '60', the program returns to step S180 to repeat the closed loop of steps S180 through S260. When the target temperature TP is equal to the value '61' at step S260, the program determines completion of the initial pre-load adjustment and exits from the routine. In this embodiment, the adjustment of the initial pre-load is completed at the target temperature Tp of 60° C. Completion of the adjustment is, however, determined arbitrarily according to a desirable temperature range.

Although the initial pre-load is adjusted by incrementing the target temperature TP from the water supply temperature Tw in the embodiment, any other structures representing the relationship between the temperature TC of water mixture and the pre-load adjustment quantity FS may be applicable to adjustment of the initial pre-load. Possible examples include a structure of decrementing the target temperature TP from a hot water supply temperature Th, another structure of incrementing or decrementing the target temperature TP in a predetermined temperature range, for example, in a range from 35° C. to 45° C., and still another structure of determining an increment of the target temperature TP based on the value of the target temperature TP. In the last structure, for example, the target temperature TP is incremented by one in a temperature range of 35° C. to 45° C. and by two in the other temperature range.

Execution of the routine shown in FIG. 13 selects an appropriate pattern of the control gain K to the spring characteristics of the temperature-coil spring 80, thus allowing adequate feed-back control. The map representing the relationship between the temperature TC of water mixture and the pre-load adjustment quantity FS is prepared by actually mixing hot water with cold water after installation of the combination faucet 10. Such process gives a map having high suitability and allows the temperature TC of water mixture to quickly come close to the target temperature TP after completion of this routine.

Figure 15:
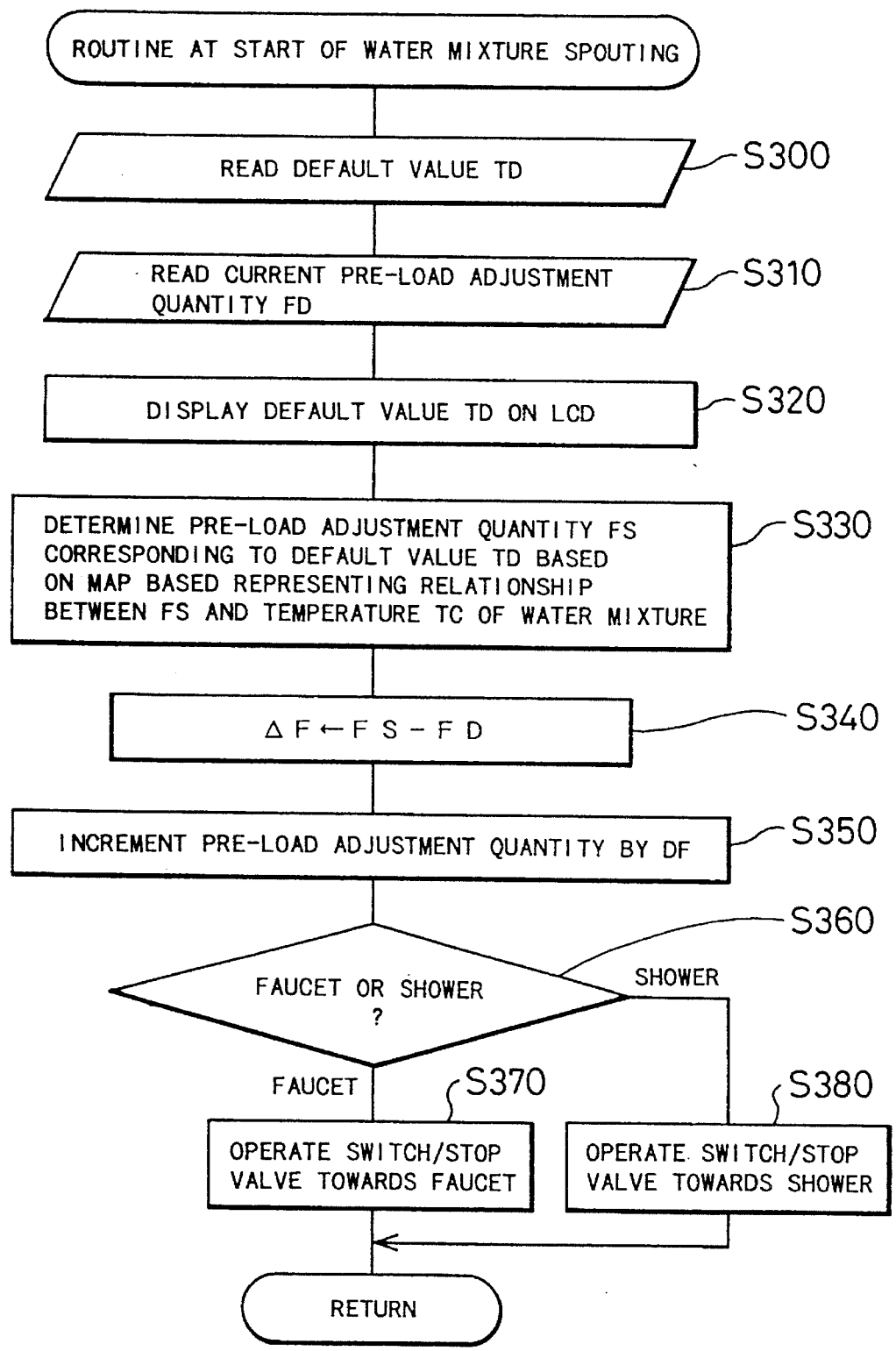
FIG. 15 is a flowchart of a routine executed at a start of water mixture spouting by the electronic control unit 150.

A routine executed by the electronic control unit 150 at a start of water mixture spouting is described according to the flowchart of FIG. 15. The program enters this routine when a switch signal is input via the switch input circuit 150f in response to depressing the shower selection switch 175 or the faucet selection switch 176 on the panel controller 170.

The electronic control unit 150 first reads a default value TD (for example, 40° C.) stored as a target temperature TP of cold/hot water mixture in the ROM 150b at step S300, reads a current pre-load adjustment quantity FD stored in the back-up RAM 150d at step S310, and then displays the default value TD on the LCD 160 at step S320. The program subsequently proceeds to step S330 at which a pre-load adjustment quantity FS corresponding to the default value TD is determined according to a map (not shown), which represents the relationship between the temperature TC of water mixture and the pre-load adjustment quantity FS and is stored in the back-up RAM 150d by the initial pre-load adjustment routine shown in FIG. 13. At step S340, the electronic control unit 150 determines an actual pre-load adjustment quantity $\Delta F$ by subtracting the current pre-load adjustment quantity FD from the pre-load adjustment quantity FS thus determined at step S330. The current pre-load adjustment quantity FD is then incremented by the actual pre-load adjustment quantity $\Delta F$ at step S350.

The default value TD may be set arbitrarily, but is preferably set equal to the common-use temperature TC of water mixture so as to prevent hot water or cold water from spouting from the shower or the faucet. In an alternative structure where the movable valve cylinder 70 is controlled to allow the flow of water mixture having the common-use temperature TC without the default value TD, steps S300 through S350 are omitted.

The program then proceeds to step S360 at which it is determined whether the shower selection switch 175 or the faucet selection switch 176 is depressed. When the faucet selection switch 176 is pressed, the program goes to step S370 at which the switch/stop motor 127 is driven to connect the spout port 126 of the rotational disk 125 to the second spout port 123 of the fixed disc 121. When the shower selection switch 175 is pressed, on the other hand, the program goes to step S380 at which the switch/stop motor 127 is driven to connect the spout port 126 of the rotational disk 125 to the first spout port 122 of the fixed disc 121. Connection of the spout port 126 of the rotational disk 125 to the first spout port 122 or the second spout port 123 of the fixed disc 121 allows the flow of water mixture from the shower 130 or the faucet 140. After execution of step S370 or S380, the program exits from the routine.

Figure 16:
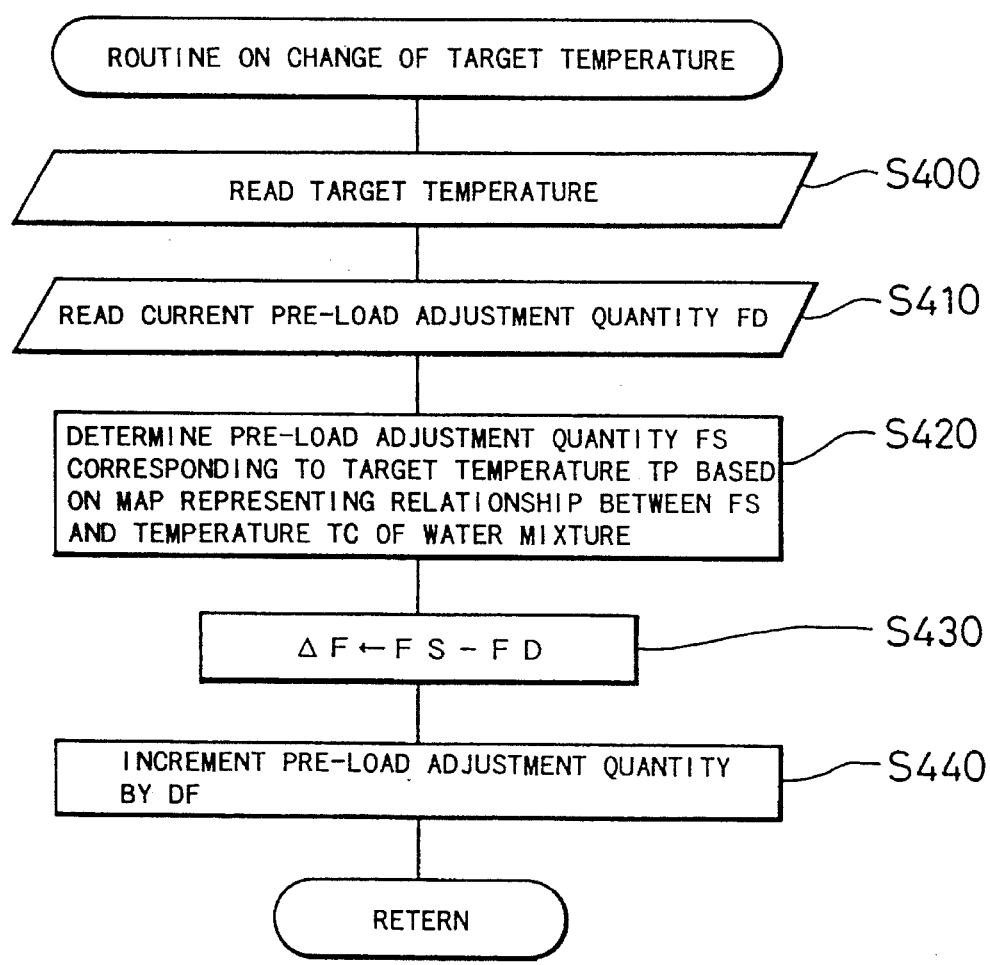
FIG. 16 is a flowchart of a routine executed on a variation in the target temperature by the electronic control unit 150.

A routine executed by the electronic control unit 150 at the time of changing the setting of the target temperature TP is described according to the flowchart of FIG. 16. The program enters this routine in response to depressing the decrement switch 171 or the increment switch 172 on the panel controller 170 for setting the target temperature TP of water mixture.

The electronic control unit 150 first reads a newly-set target temperature TP at step S400 and then reads a current pre-load adjustment quantity FD at step S410. The program subsequently proceeds to step S420 at which the electronic control unit 150 determines a pre-load adjustment quantity FS corresponding to the newly-set target temperature TP by the map representing the relationship between the temperature TC of water mixture and the pre-load adjustment quantity FS. At step S430, an actual pre-load adjustment quantity $\Delta F$ is determined by subtracting the current pre-load adjustment quantity FD from the pre-load adjustment quantity FS determined at step S420. After incrementing the current pre-load adjustment quantity FD by the actual pre-load adjustment quantity $\Delta F$ at step S440, the program exits from the routine.

As a result of processing shown in the flowcharts of FIGS. 15 and 16, water mixture of hot water and cold water is made to flow at a temperature set through operations of the decrement switch 171 and the increment switch 172. The temperature of water mixture running from the shower 130 or the faucet 140 is adjusted with the temperature-sensitive coil spring 80 composed of a shape memory alloy (SMA). Operations of the temperature-sensitive coil spring 80 are described hereafter.

When the actual temperature TC of the water mixture becomes equal to the target temperature TP and various conditions, such as the hot water supply temperature Th from the water heater and the temperature and flow of tap water, are under a stationary state, an equilibrium of a spring force applied onto the temperature-sensitive coil spring 80 by the water mixture in the mixing chamber 64 and a spring force or pre-load of the second coil spring 90 determines the position of the movable valve cylinder 70 and keeps the movable valve cylinder 70 at the position thus determined. When any of the various conditions, such as the hot water supply temperature Th from the water heater, the temperature of tap water, or the flow of tap water is varied due to outside disturbances, the actual temperature TC of the water mixture in the mixing chamber 64 deviates, in response to the variation, from the target temperature TP to cause a temperature deviation $\Delta T$. The temperature-sensitive coil spring 80 changes its spring constant in response to the temperature deviation $\Delta T$ and thereby varies the spring force thereof. When the actual temperature TC of the water mixture is higher than the target temperature TP, the spring force of the temperature-sensitive coil spring 80 increases to shift the movable valve cylinder 70 leftward in FIG. 9 as increasing the pre-load of the second coil spring 90. This results in decreasing the ratio of hot water in the water mixture, thus lowering the temperature TC of the water mixture. On the other hand, when the actual temperature TC of the water mixture is lower than the target temperature TP, the spring force of the temperature-sensitive coil spring 80 decreases to allow the second coil spring 90 to shift the movable valve cylinder 70 rightward in FIG. 9. This results in decreasing the ratio of cold water in the water mixture, thus raising the temperature TC of the water mixture. Such actions of the temperature-sensitive coil spring 80 keep the actual temperature TC of the water mixture sufficiently close to the target temperature TP.

Figure 17:
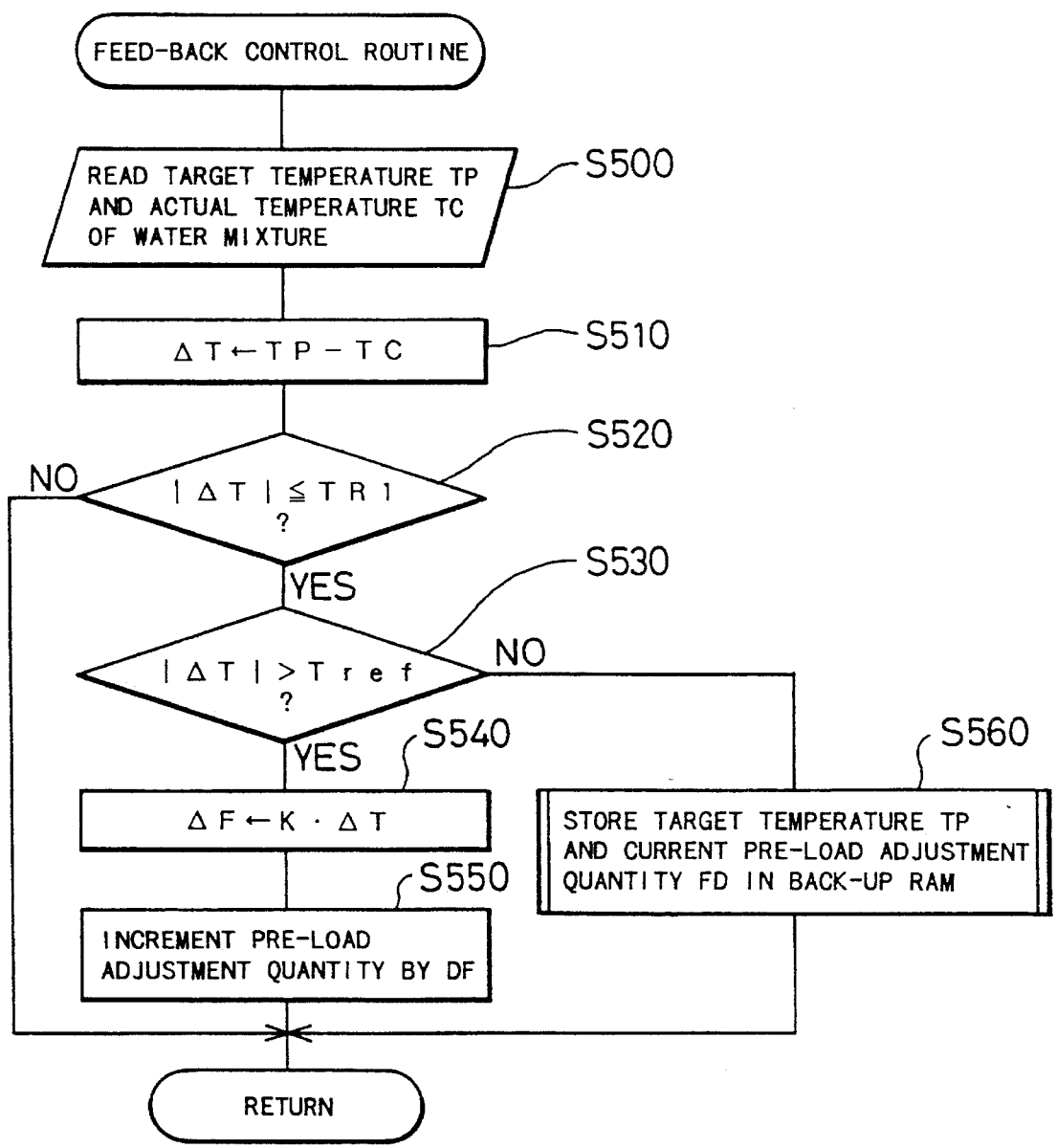
FIG. 17 is a flowchart of a feedback control routine executed by the electronic control unit 150.

After the start of water mixture spouting according to the routine of FIG. 15 or after the change of the target temperature TP according to the routine of FIG. 16, the electronic control unit 150 executes a feed-back control routine to regulate the temperature TC of the water mixture as shown in the flowchart of FIG. 17. This routine is executed at predetermined time intervals, for example, at every 100 milliseconds.

When the program enters the routine, the electronic control unit 150 first reads a target temperature TP and an actual temperature TC of the water mixture detected by the temperature sensor 110 at step S500. The program then goes to step S510 at which a temperature deviation $\Delta T$ is determined by subtracting the temperature of the water mixture from the target temperature TP. An absolute value of the temperature deviation $\Delta T$ thus determined is then compared with a threshold value TR1 at step S520. When the absolute value of the temperature deviation $\Delta T$ is greater than the threshold value TR1, the program determines that the temperature deviation $\Delta T$ is out of a feed-back control range and exits from the routine.

The threshold value TR1 for determining a start of feed-back control is set to be greater than a difference between the target temperature TP and the actual temperature TC of water mixture under the stationary conditions of the movable valve cylinder 70 at a position initially set by the routine of FIG. 15 executed at the start of water mixture spouting or the routine of FIG. 16 executed in response to a change of the target temperature. The difference between the target temperature TP and the actual temperature TC of the water mixture depends upon the varied quality of the temperature-sensitive coil spring 80 and the second coil spring 90 as well as the time-based variation in the spring constant of the temperature-sensitive coil spring 80. Thus, it is preferable to set the threshold value TR1 equal to a sum of the difference and some surplus.

While the absolute value of the temperature deviation $\Delta T$ is greater than the threshold value TR1, spout of dead water from a hot water supply conduit or a cold water supply conduit is not completed or otherwise the pre-load adjustment motor 105 is under operating conditions. Execution of feed-back control under such conditions results in erroneously reading a transient value as the temperature TC of the water mixture and setting an inappropriate value as the pre-load adjustment quantity FS, thereby preventing the temperature TC of the water mixture from quickly approaching the target temperature TP. The feed-back control is accordingly not executed until the absolute value of the temperature deviation $\Delta T$ becomes equal to or less than the threshold value TR1.

On the other hand, when the absolute value of the temperature deviation $\Delta T$ is not greater than the threshold value TR1 at step S520, the program goes to step S530 at which the absolute value of the temperature deviation $\Delta T$ is further compared with the threshold value Tref described above. When the absolute value of the temperature deviation $\Delta T$ is greater than the threshold value Tref, the program goes to step S540 at which an actual pre-load adjustment quantity $\Delta F$ is determined by multiplying the temperature deviation $\Delta T$ by a control gain K, which is determined according to the relationship between the variation $\Delta BK$ of the spring constant and the control gain K depending upon inputs of the characteristic values T1 and θ. A current pre-load adjustment quantity FD is then incremented by the actual pre-load adjustment quantity ΔF at step S550. But if the absolute value of the temperature deviation ΔT is not greater than the threshold value Tref at step S530, the program proceeds to step S560 at which the electronic control unit 150 stores into the back-up RAM 150d the values of the target temperature TP and the current pre-load adjustment quantity FD as a new set of values of the actual temperature TC of the water mixture and the pre-load adjustment quantity FS. Namely, the relationship between the temperature TC of water mixture and the pre-load adjustment quantity FS is partly updated on each operation of the combination faucet 10.

Execution of the feed-back control routine at a start of water mixture spouting drives the combination faucet 10 in the following manner. An initial pre-load is maintained until the temperature deviation ΔT of the actual temperature TC of the water mixture from the target temperature TP becomes smaller than the threshold value TR1. The initial pre-load is determined according to the map representing the relationship between the temperature TC of the water mixture and the pre-load adjustment quantity FS. Since cold water retained in a supply conduit from the water heater to the combination faucet 10 flows out immediately after the start of water mixture spouting, the actual temperature TC of the water mixture is significantly lower than the target temperature TP. Under such conditions, the temperature-sensitive coil spring 80 varies its spring constant in response to the low temperature and shifts the movable valve disc 70 to increase the ratio of hot water. The greater ratio of hot water in the water mixture enhances the speed of spouting of dead water.

When hot water from the water heater reaches the combination faucet 10, the temperature TC of the water mixture abruptly rises. The temperature-sensitive coil spring 80 quickly responds to the temperature increase to vary its spring constant, and shifts the movable valve disc 70 to decrease the ratio of hot water. The temperature-sensitive coil spring 80 is composed of an SMA having a relatively small heat capacity and is directly in contact with the water mixture of hot water and cold water. This ensures quick response and effectively prevents an overshoot. When the temperature deviation ΔT becomes less than the threshold value TR1, the feed-back control starts to compensate for the temperature deviation ΔT, which cannot be canceled by the temperature control with the temperature-sensitive coil spring 80, and maintains the actual temperature TC of the water mixture sufficiently close to the target temperature TP.

As described above, in the combination faucet 10 of this embodiment, the temperature-sensitive coil spring 80 is composed of an SMA having a spring constant that varies with the temperature. The temperature-sensitive coil spring 80 accordingly varies its spring constant in response to a variation in the temperature TC of the water mixture due to any outside disturbance and shifts the movable valve cylinder 70 in a direction of compensating for the temperature variation, so that the temperature TC of the water mixture is kept sufficiently close to the target temperature TP. The temperature-sensitive coil spring 80 composed of an SMA having a relatively small heat capacity and in direct contact with the water mixture can, without delay, respond to a variation in the temperature TC of the water mixture, thus allowing the temperature TC of the water mixture to be maintained substantially equal to the target temperature.

When the temperature control with the temperature-sensitive coil spring 80 is unable to sufficiently cancel the temperature deviation ΔT of the actual temperature TC of the water mixture from the target temperature TP, which is caused by an outside disturbance during spouting of water mixture, feed-back control is executed to compensate for the temperature deviation ΔT and allow the temperature TC of the water mixture to be kept substantially equal to the target temperature TP. The feed-back control implemented by varying the control gain K against the variation ΔBK of the spring constant effectively regulates the temperature TC of the water mixture without causing an undesirable hunting even when the target temperature TP is set in a temperature range where the variation ΔBK of the spring constant is not steady.

At a startup of water mixture spouting or on a change of the target temperature TP, the position of the movable valve disc 70 is determined by the pre-load adjustment quantity FS corresponding to the default value TD or the target temperature TP so as to allow the temperature TC of the water mixture to quickly come close to the default value TD or the target temperature TP. Since the feed-back control is not executed until the temperature deviation ΔT becomes smaller than the threshold value TR1, detection of the temperature TC of water mixture at the time of spouting dead water does not cause the pre-load adjustment mechanism 100 to vary the pre-load of the second coil spring 90. This effectively prevents hot water from spouting abruptly after completion of dead water spouting. During the spouting of dead water, the spring constant BK of the temperature-sensitive coil spring 80 is varied to press the movable valve cylinder 70 to increase the ratio of hot water, thereby enhancing the speed of spouting dead water.

The pattern of the control gain K is determined according to inputs of the characteristic values T1 and θ for the feed-back control. This process ensures adequate and proper temperature control regardless of the varied spring characteristics of the temperature-sensitive coil spring 80.

Preparation of the map representing the temperature TC of the water mixture and the pre-load adjustment quantity FS after installation of the combination faucet 10 can determine the appropriate relationship between the temperature TC and the pre-load adjustment quantity FS based on the conditions of installation. This allows the temperature TC of the water mixture to quickly come close to the target temperature TP at a start of water mixture spouting or on a change of the target temperature TP. When the temperature TC of the water mixture becomes steady and substantially equal to the target temperature TP during the feed-back control, the target temperature TP and the current pre-load adjustment quantity FD are stored as a new set of values of the actual temperature TC of water mixture and the pre-load adjustment quantity FS in the back-up RAM 150d. The relationship between the temperature TC of the water mixture and the pre-load adjustment quantity FS is accordingly updated depending upon a season-oriented variation in the water supply temperature Tw as well as upon a time-based change of the spring constant of the temperature-sensitive coil spring 80. An appropriate initial value is assigned to a pre-load in order to allow the temperature TC of the water mixture to approach the target temperature TP quickly regardless of the season-oriented variation in the water supply temperature Tw or the time-based variation in the spring constant.

In the combination faucet 10 of the embodiment, when the absolute value of the temperature deviation ΔT is not greater than the threshold value Tref at step S530 in the feed-back control routine shown in FIG. 17, the target temperature TP and the current pre-load adjustment quantity FD are stored in the back-up RAM 150d as a new set of values of the actual temperature TC of the water mixture and the pre-load adjustment quantity FS. Neither the target temperature TP nor the current pre-load adjustment quantity FD may, however, be stored in the back-up RAM 150d like an alternative feed-back control routine shown by the flowchart of FIG. 18. The same step numbers are allocated to steps in the alternative feed-back control routine of FIG. 18 which are identical with those of the feed-back control routine of FIG. 17.

Figure 18:
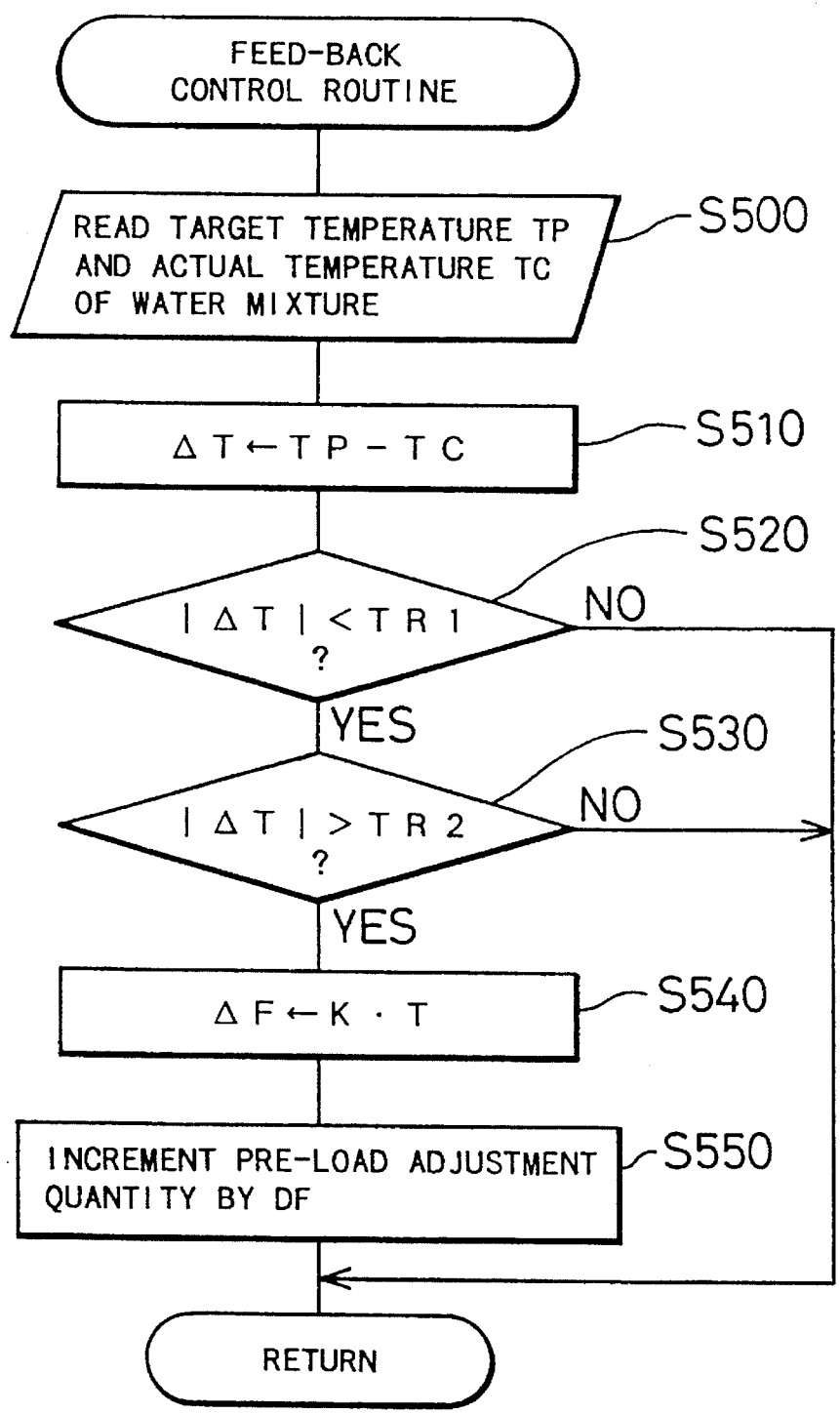
FIG. 18 is a flowchart of another feedback control routine executed by the electronic control unit 150.

In the feed-back control routine of FIG. 17 or the alternative feed-back control routine of FIG. 18, the feed-back control is not implemented while the absolute value ΔT is greater than the threshold value. This prevents inappropriate feed-back control while dead water in a cold water supply conduit or a hot water supply conduit is flowing out or the pre-load adjustment motor 105 is in operation. Another possible structure starts the feed-back control only after a predetermined time period has elapsed since the start of water mixture spouting or the change of the target temperature, as realized by a feed-back control routine shown in the flowchart of FIG. 19.

Figure 19:
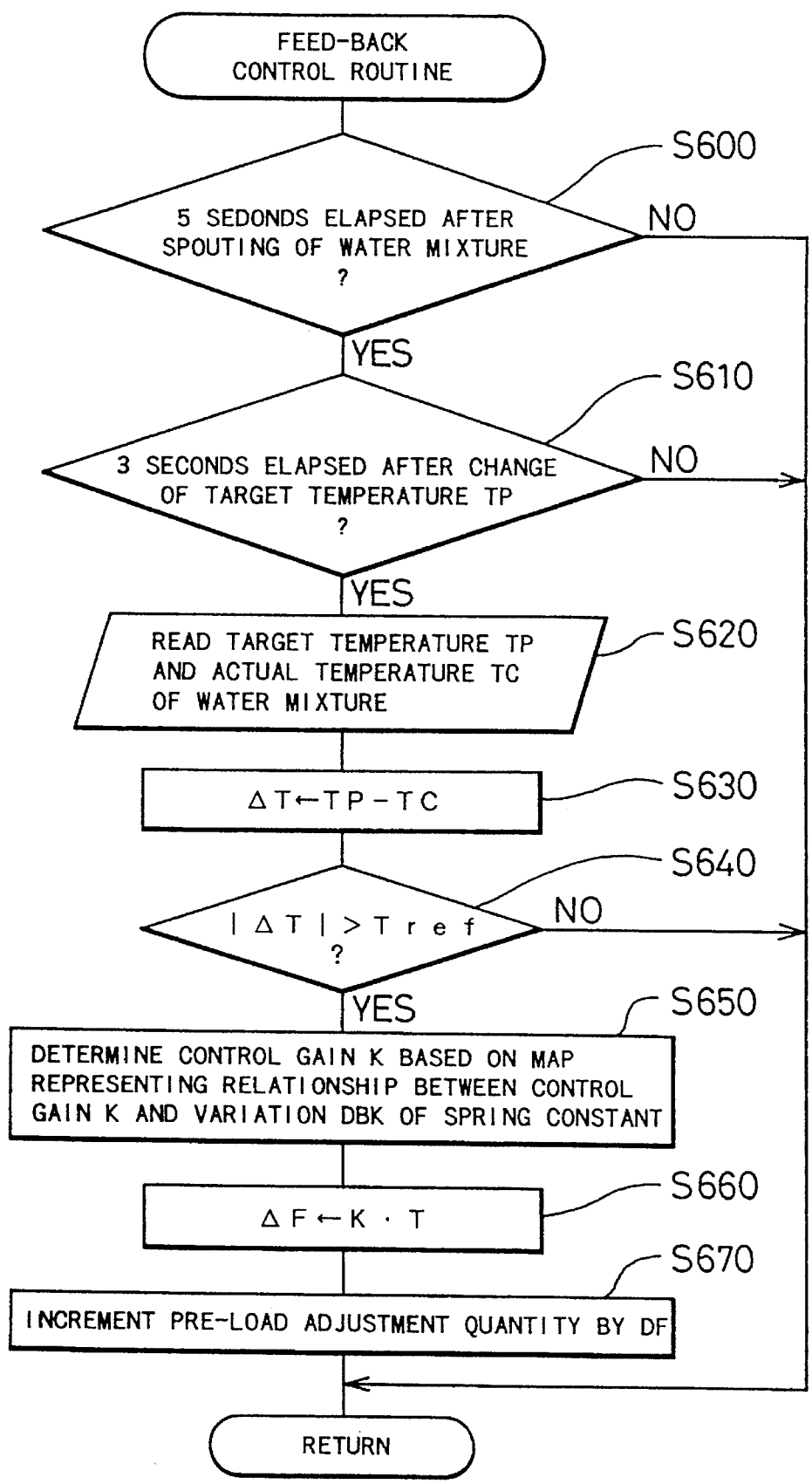
FIG. 19 is a flowchart of still another feedback control routine executed by the electronic control unit 150.

The combination faucet 10 works in the following manner when executing the feed-back control routine of FIG. 19 instead of the feed-back control routine of FIG. 17.

When the program enters the routine, the electronic control unit 150 first determines whether a predetermined time interval, for example, five seconds, has elapsed since a start of water mixture spouting at step S600, and then determines whether a preset time interval, for example, three seconds, has elapsed since a change of the target temperature TP at step S610. When five seconds have not elapsed since the start of water mixture spouting or when three seconds have not elapsed since the change of the target temperature TP, the program exits from the routine. Since the temperature TC of the water mixture is unstable immediately after the start of water spouting, feed-back control should not be executed until five minutes have elapsed since the start of water spouting. Hot water in a supply conduit has been cooled below a predetermined temperature during a time interval between a stop of water spouting and a re-start of water spouting. This makes the temperature TC of water mixture significantly lower than the target temperature TP immediately after the re-start of water spouting. The temperature TC of the water mixture then rises abruptly in response to the supply of hot water from the water heater. Although the time interval between the start of water spouting and the start of the feed-back control is set equal to five seconds in this embodiment, it may be arbitrarily determined according to the piping conditions including the distance between a water heater and the combination faucet 10. The feed-back control is executed only after the preset time interval (three seconds in this embodiment) has elapsed since the change of the target temperature TP. This is because a certain time period is required to stabilize the temperature TC of water mixture after the change of the target temperature TP. Although the time interval after the change of the target temperature TP is set equal to three seconds in this embodiment, it may be arbitrarily determined according to the characteristics of the combination faucet 10, such as the capacity of the combination faucet 10 and the position of the temperature sensor 110.

When the answer is YES for both the steps S600 and S610, the program goes to step S620 where the electronic control unit 150 reads the target temperature TP and the actual temperature TC of the water mixture detected by the temperature sensor 110. At step S630, a temperature deviation ΔT is determined by subtracting the temperature TC of the water mixture from the target temperature TP. The program then goes to step S640 at which the absolute value of the temperature deviation ΔT thus determined is compared with the threshold value Tref as described previously. When the absolute value of the temperature deviation ΔT is not greater than the threshold value Tref, the program exits from the routine.

On the other hand, when the absolute value of the temperature deviation ΔT is greater than the threshold value Tref, the program proceeds to step S650 at which a control gain K is determined according to the relationship between the variation ΔBK of the spring constant and the control gain K. An actual pre-load adjustment quantity ΔF is then calculated by multiplying the temperature deviation ΔT by the control gain K at step S660. After incrementing a current pre-load adjustment quantity FD by the actual pre-load adjustment quantity ΔF at step S670, the program exits from the routine.

Figure 20:
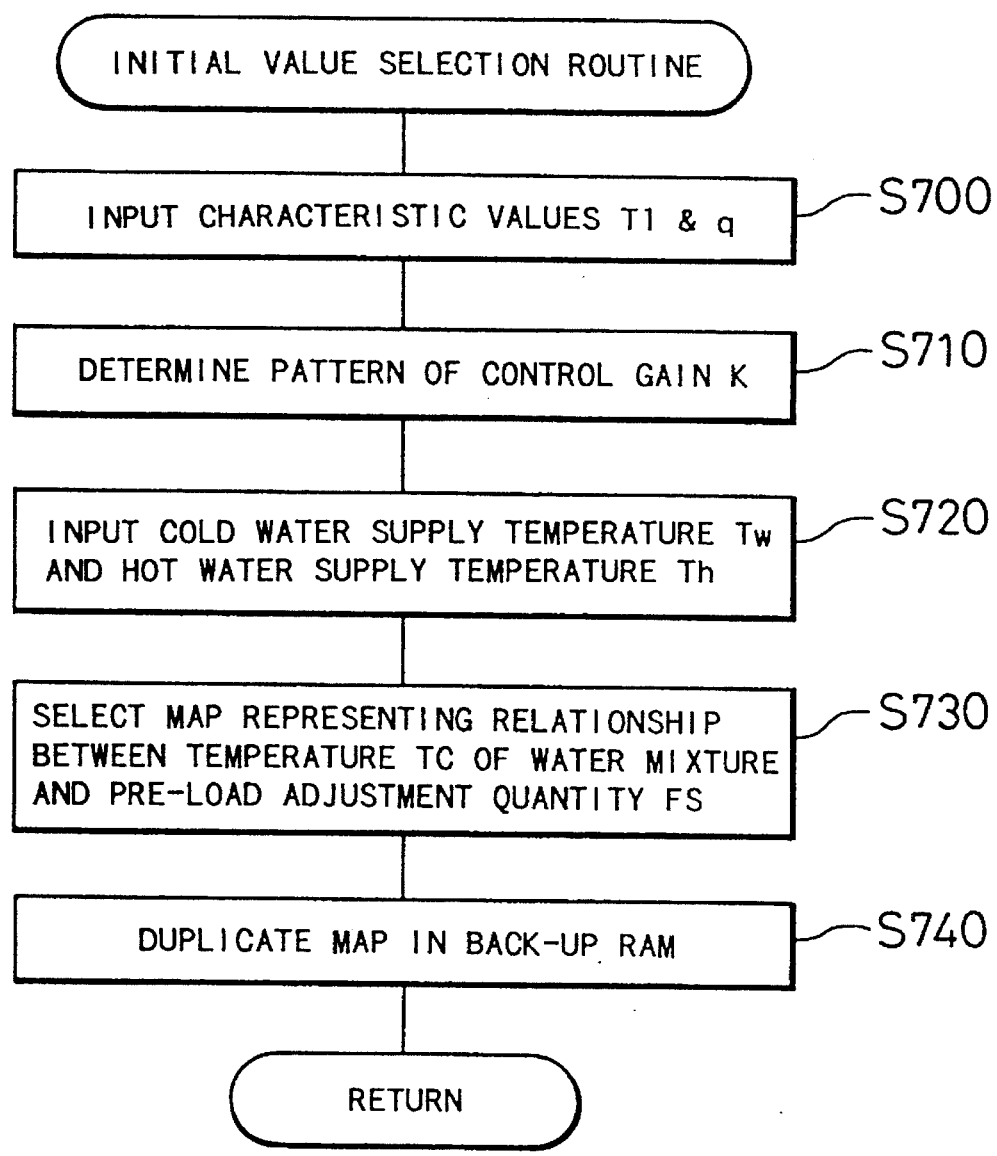
FIG. 20 is a flowchart of an initial value selection routine executed by an electronic control unit 150 of a combination faucet according to a second embodiment of the invention.

A second embodiment of the invention is described based mainly on the flowchart of FIG. 20. A combination faucet of the second embodiment has an identical hardware structure to that of the first embodiment and executes the routine of FIG. 15 at the start of water mixture spouting, the routine of FIG. 16 in response to the change of the target temperature TP, and the feed-back control routine of FIG. 17. However, in the combination faucet of the second embodiment, an initial value selection routine shown in FIG. 20 is executed instead of the initial pre-load adjustment routine in the first embodiment shown in FIG. 13. The initial value selection routine is executed at the time of newly installing a combination faucet 10 or resuming the use of the combination faucet 10 after a long interval.

In response to a user inputting characteristic values T1 and θ representing the spring characteristics of the temperature-sensitive coil spring 80 (step S700), the pattern of a control gain K is determined at step S710. This process was described previously in detail and will not be explained here.

The user then inputs a cold water supply temperature Tw and a hot water supply temperature Th (step S720). That is, the user selects one of three alternatives 'High', 'Medium', and 'Low' displayed on the LCD 160 to input the cold water supply temperature Tw. When the user selects the indication 'High', a summer water temperature of 25° C. is set for the cold water supply temperature Tw. In a similar manner, a spring or fall water temperature of 15° C. and a winter water temperature of 5° C. are set for the cold water supply temperature Tw in response to a selection of 'Medium' and 'Low', respectively. The display on the LCD 160 changes between 'High', 'Medium' and 'Low' with the decrement switch 171 and the increment switch 172 on the panel controller 170. The display on the LCD 160 changes from 'High', to 'Medium', to 'Low' by each press of the decrement switch 171 whereas the display changes from 'Low', to 'Medium' to 'High' by each press of the increment switch 172. While a desired indication is displayed on the LCD 160, the user operates the stop switch 177 to set the cold water supply temperature Tw.

The user also inputs a hot water supply temperature Th by selecting one of three alternatives 'High', 'Medium', and 'Low' in the same manner as above. The hot water supply temperature Th is set equal to 90° C., 75° C., or 60° C. in response to a selection of 'High', 'Medium', or 'Low', respectively.

The program then goes to step S730 at which a map (not shown) representing the relationship between the temperature TC of the water mixture and the pre-load adjustment quantity FS is selected corresponding to a combination of the cold water supply temperature Tw and the hot water supply temperature Th input by the user. Maps corresponding to combinations of the cold water supply temperature Tw and the hot water supply temperature Th are previously stored in the ROM 150b. The map thus selected is duplicated and stored in a predetermined area of the back-up RAM 150d at step S740.

In the second embodiment, both the cold water supply temperature Tw and the hot water supply temperature Th have three alternatives 'High', 'Medium', and 'Low'. Maps representing the relationship between the temperature TC of the water mixture and the pre-load adjustment quantity FS are prepared corresponding to combinations of the cold water supply temperature Tw and the hot water supply temperature Th. There may, however, be less or more alternatives for the cold water supply temperature Tw and the hot water supply temperature Th. Another possible structure allows the user to directly input desirable values for the cold water supply temperature Tw and the hot water supply temperature Th. Although the indications 'High', 'Medium', and 'Low' respectively represent 25° C., 15° C., and 5° C. for the cold water supply temperature Tw and 90° C., 75° C., and 60° C. for the hot water supply temperature Th in this embodiment, these values may be arbitrarily determined according to a variety of conditions, such as the place where the combination faucet 10 is installed and the performance of a water heater. Other data like a type of the water heater may be specified instead of the combination of the cold water supply temperature Tw and the hot water supply temperature Th.

As described above, in the combination faucet 10 of the second embodiment, a plurality of maps representing the relationship between the temperature TC of the water mixture and the pre-load adjustment quantity FS are previously prepared and stored in the ROM 150b. A map is selected corresponding to inputs of the cold water supply temperature Tw and the hot water supply temperature Th. An initial pre-load is quickly and easily set corresponding to actual or equivalent values of the cold water supply temperature Tw and the hot water supply temperature Th.

Even when the initially set pre-load causes a temperature deviation ΔT of the actual temperature TC of water mixture from a target temperature TP, the feed-back control allows quick approach of the temperature TC of water mixture to the target temperature TP. Other effects of the second embodiment are similar to those of the first embodiment and are not described here.

Figure 21:
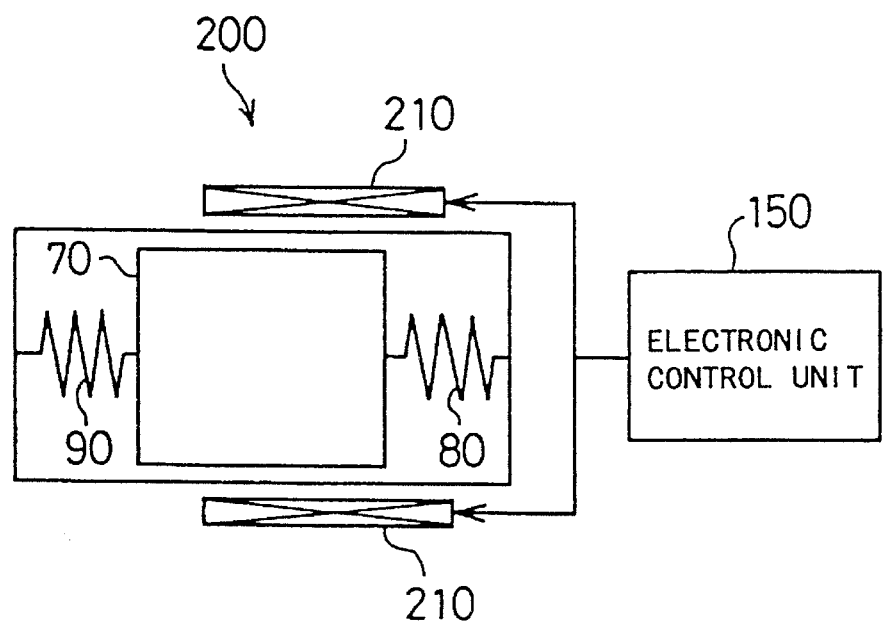
FIG. 21 is a schematic of a pre-load adjustment mechanism 200 of a combination faucet according to a third embodiment of the invention.

A third embodiment of the invention is described mainly based on the schematic drawing of FIG. 21. A combination faucet of the third embodiment includes a pre-load adjustment mechanism 200 in place of the pre-load adjustment mechanism 100 disposed in the valve unit 15 of the first embodiment shown in FIG. 9. Operations of the third embodiment are identical with the routine of FIG. 15 at the start of water mixture spouting, the routine of FIG. 16 in response to the change of the target temperature TP, and the feed-back control routine of FIG. 17. The structure and operations of the pre-load adjustment mechanism 200 of the third embodiment are described with referring to FIG. 21.

The pre-load adjustment mechanism 200 includes a coil 210 as well as a movable valve cylinder 70 composed of a ferrite material. A surface of the movable valve cylinder 70 in contact with the bore 62 of the housing 61 (see FIG. 9) is covered with a fluororesin, in order to reduce friction of the movable valve cylinder 70 against the bore 62. The coil 210 extends in an axial direction of the movable valve cylinder 70 and is arranged around the movable valve cylinder 70. The coil 210 is connected to an electronic control unit 150, and generates a force for attracting the movable valve cylinder 70 towards the coil 210 (that is, a rightward force in FIG. 21) in response to the flow of electricity. The movable valve cylinder 70 accordingly shifts from a position of balance of spring forces of a temperature-sensitive coil spring 80 and a second coil spring 90 to a new position of balance including a force generated by a magnetic field as well as the spring forces. Variation in the electric current running into the coil 210 results in arranging the movable valve disc 70 at a desirable position.

The combination faucet of the third embodiment described above drives the movable valve cylinder 70 by means of electromagnetic induction, thereby keeping the high liquid-tightness of the valve unit 15. The third embodiment which does not use a motor for adjustment of the pre-load has a simple structure with a high reliability.

A preferable modification of the third embodiment for the power saving adjusts the temperature-sensitive coil spring 80 and the second coil spring 90 to locate the movable valve cylinder 70 before the spout of water mixture at a certain position representing a predetermined ratio of hot water to cold water to give a commonly used temperature (for example, 40° C.). In such a case, the routine of FIG. 15 executed at the start of water mixture spouting does not require steps S300 through S350 for adjusting the pre-load to make the temperature TC of water mixture equal to the default value TD. A plurality of coils, in place of the coil 210, may be arranged along the axis of the movable valve cylinder 70 for generating a magnetic field in the axial direction of the movable valve cylinder 70. Although the whole movable valve cylinder 70 is composed of a ferrite material in the embodiment, only a part of the movable valve cylinder 70, such as, spring bearings 76 and 77, may be composed of a ferrite material.

Figure 22:
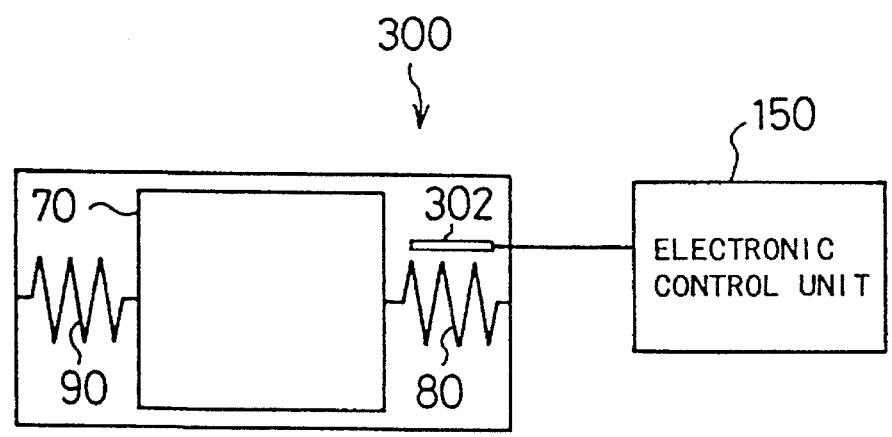
FIG. 22 is a schematic of a pre-load adjustment mechanism 300 of a combination faucet according to a fourth embodiment of the invention.

A fourth embodiment of the invention is described mainly based on the schematic drawing of FIG. 22. A combination faucet of the fourth embodiment includes a pre-load adjustment mechanism 300 in place of the pre-load adjustment mechanism 100 disposed in the valve unit 15 of the first embodiment shown in FIG. 9. Operations of the fourth embodiment are identical with the routine of FIG. 15 at the start of water mixture spouting, the routine of FIG. 16 in response to the change of the target temperature TP, and the feed-back control routine of FIG. 17. The structure and operations of the pre-load adjustment mechanism 300 of the third embodiment are described with referring to FIG. 22.

The pre-load adjustment mechanism 300 includes a heating element 302 which is disposed near a temperature-sensitive coil spring 80 for pressing a movable valve cylinder 70 in one direction. The temperature of the heating element 302 is controlled by signals output from an electronic control unit 150. The heating element 302 raises the temperature TC of water mixture in the vicinity of the temperature-sensitive coil spring 80, and varies the spring constant of the temperature-sensitive coil spring 80 in response to the increase of the temperature TC. The variation in the spring constant destroys a balance of spring forces of the temperature-sensitive coil spring 80 and a second coil spring 90, and shifts the movable valve cylinder 70 to a new position of balance. The spring constant of the temperature-sensitive coil spring 80 is varied depending upon the temperature in the vicinity of the temperature-sensitive coil spring 80. The temperature is determined according to a heat quantity emitted from the heating element 302, the temperature TC of water mixture before coming into contact with the heating element 302, and the flow of the water mixture. Under the condition of a steady flow of the water mixture, a variation in the heat quantity emitted from the heating element 302 drives the movable valve cylinder 70 to control the temperature TC of the water mixture.

In the combination faucet of the fourth embodiment described above, the pre-load adjustment mechanism 300 does not have a movable member, thereby keeping the high liquid-tightness of the valve unit 15. The fourth embodiment which does not use a motor for adjustment of the pre-load has a simple structure with a high reliability.

Although the heating element 302 is positioned in the vicinity of the temperature-sensitive coil spring 80 in the fourth embodiment, the heating element 302 may be arranged to come into direct contact with the temperature-sensitive coil spring 80. Another possible structure varies the temperature of the temperature-sensitive coil spring 80 by supplying electricity directly to the temperature-sensitive coil spring 80. The second coil spring 90 and the temperature-sensitive coil spring 80 may be composed of an identical SMA, so that the heating element 302 controls the temperature of the second coil spring 90 regardless of the temperature TC of the water mixture.

There may be many modifications, alternations, and changes without departing from the scope or spirit of essential characteristics of the invention. It is thus clearly understood that the above embodiments are only illustrative and not restrictive in any sense. Some examples of modification include a structure without the feed-back control and a structure of updating the temperature of the water mixture based on an estimated deviation of the actual temperature of the water mixture from a target temperature.

The scope and spirit of the present invention are limited only by the terms of the appended claims.

What is claimed is:

1. A combination faucet comprising:
   a mixing valve having a movable valve member for adjusting a mixing ratio of hot water to cold water;
   a first spring comprising a material which varies a spring constant of said first spring according to a temperature variation in a predetermined temperature range, said first spring pressing said movable valve member in a predetermined first direction for reducing the ratio of said hot water to said water mixture of hot water and cold water flowing out of said mixing valve;
   a second spring for pressing said movable valve member in a predetermined second direction opposite to said predetermined first direction;
   pre-load adjustment means for adjusting a pre-load of at least one spring of said first spring and said second spring;
   temperature detection means for detecting temperature of said water mixture;
   initial pre-load setting means for controlling said pre-load adjustment means to set the pre-load equal to an initial value corresponding to a target temperature of said water mixture; and
   electronic means for controlling said pre-load adjustment means to compensate for deviation between the temperature of said water mixture detected by said temperature detection means and said target temperature after a setting of said pre-load by said initial pre-load setting means.

2. A combination faucet in accordance with claim 1, wherein said pre-load adjustment means comprises means for changing an effective length of either said first spring or said second spring.

3. A combination faucet in accordance with claim 1, wherein said pre-load adjustment means comprises means utilizing electromagnetic induction for pressing said movable valve member in either said first direction or said second direction.

4. A combination faucet in accordance with claim 1, wherein said pre-load adjustment means comprises heating means for controlling temperature of said first spring regardless of the temperature of said water mixture.

5. A combination faucet comprising:
   a mixing valve having a movable valve member for adjusting a mixing ratio of hot water to cold water;
   a first spring comprising a material which varies a spring constant of said first spring according to a temperature variation in a predetermined temperature range, said first spring pressing said movable valve member in a predetermined first direction for reducing the ratio of said hot water to said cold water in response to an increase in a temperature of a water mixture of hot water and cold water flowing out of said mixing valve;
   a second spring for pressing said movable valve member in a predetermined second direction opposite to said predetermined first direction;
   pre-load adjustment means for adjusting a pre-load of at least one spring of said first spring and said second spring;
   temperature detection means for detecting temperature of said water mixture;
   pre-load control means feed-back controlling said pre-load adjustment means to compensate for deviation between the temperature of said water mixture detected by said temperature detection means and a target temperature; and
   control gain determination means for determining a feed-back control gain of said pre-load control means based on mixing conditions of hot water and cold water.

6. A combination faucet in accordance with claim 5, wherein said control gain determination means comprises means for determining said feed-back control gain based on the temperature of said water mixture.

7. A combination faucet in accordance with claim 5, wherein said control gain determination means comprises means for determining said feed-back control gain based on a variation of the spring constant of said first spring in response to the temperature of said water mixture.

8. A combination faucet in accordance with claim 5, wherein said control gain determination means comprises means for setting said feed-back control gain equal to a predetermined first value when the temperature of said water mixture detected by said temperature detection means is in a first range where a variation of the spring constant of said first spring is steady, and for setting said feed-back control gain equal to a predetermined second value when the temperature of said water mixture is in a second range where the variation of the spring constant is unsteady.

9. A combination faucet comprising:
   a mixing valve having a movable valve member for adjusting a mixing ratio of hot water to cold water;
   a first spring comprising a material which varies a spring constant of said first spring according to a temperature variation in a predetermined temperature range, said first spring pressing said movable valve member in a predetermined first direction for reducing the ratio of said hot water to said cold water in response to an increase in a temperature of a water mixture of hot and cold water flowing out of said mixing valve;

a second spring for pressing said movable valve member in a predetermined second direction opposite to said predetermined first direction;

pre-load adjustment means for adjusting a pre-load of at least one spring of said first spring and said second spring;

temperature detection means for detecting temperature of said water mixture;

initial pre-load setting means for controlling said pre-load adjustment means to set the pre-load equal to an initial value corresponding to a target temperature of said water mixture;

control determination means determining whether a feed-back control routine is or is not to be executed, according to magnitude of a deviation between the temperature of said water mixture detected by said temperature detection means and said target temperature after a setting of said pre-load by said initial pre-load setting means, and pre-load control means for controlling said pre-load adjustment means to compensate for said deviation when said control determination means determines said feedback control routine has been executed.

10. A combination faucet in accordance with claim 9, wherein said control determination means comprises means for determining execution of said feed-back control when said deviation is within a predetermined range and determining non-execution of said feed-back control when said deviation is out of said predetermined range.

11. A combination faucet in accordance with claim 9, wherein said control determination means comprises means for determining non-execution of said feed-back control when said deviation is within a predetermined first range, determining execution of said feed-back control when said deviation is out of said predetermined first range but within a predetermined second range which is greater than said predetermined first range, and determining non-execution of said feed-back control when said deviation is out of said predetermined second range.

12. A combination faucet comprising:

a mixing valve having a movable valve member for adjusting a mixing ratio of hot water to cold water;

a first spring comprising a material which varies a spring constant of a material which varies a spring constant of said first spring according to a temperature variation in a predetermined temperature range, said first spring pressing said movable valve member in a predetermined first direction for reducing the ratio of said hot water to said cold water in response to an increase in a temperature of water mixture of hot water and cold water flowing out of said mixing valve;

a second spring for pressing said movable valve member in a predetermined second direction opposite to said predetermined first direction;

pre-load adjustment means for adjusting a pre-load of at least one spring of said first spring and said second spring;

temperature detection means for detecting temperature of said water mixture;

pre-load memory means for storing a relationship between a target temperature of said water mixture and said pre-load;

pre-load setting means for controlling said pre-load adjustment means to set said pre-load equal to an initial value corresponding to said target temperature according to the relationship stored in said pre-load memory means;

pre-load control means for controlling said pre-load adjustment means to compensate for deviation between the temperature of said water mixture detected by said temperature detection means and said target temperature after the setting of said pre-load by said pre-load setting means; and updating means for updating the relationship stored in said pre-load memory means with a new set of values of said target temperature and said pre-load when a predetermined condition is fulfilled by said deviation of the temperature of said water mixture detected by said temperature detection means from said target temperature.

13. A combination faucet comprising:

a mixing valve having a movable valve member for adjusting a mixing ratio of hot water to cold water;

a first spring comprising a material which varies a spring constant of said first spring according to a temperature variation in a predetermined temperature range, said first spring pressing said movable valve member in a predetermined first direction for reducing the ratio of said hot water to said cold water in response to an increase in a temperature of a water mixture of hot water and cold water flowing out of said mixing valve;

a second spring for pressing said movable valve member in a predetermined second direction opposite to said predetermined first direction;

pre-load adjustment means for adjusting a pre-load of at least one spring of said first spring and said second spring;

plural pre-loads memory means for storing a plurality of relations between said pre-load and a target temperature of said water mixture;

pre-load selection means which, based on inputs of predetermined data, selects a first relation of said plurality of relations between the pre-load and the target temperature stored in said plural pre-loads memory means; and pre-load setting means for controlling said pre-load adjustment means to set said pre-load equal to an initial value corresponding to said target temperature according to said first relation selected by said pre-load selection means.

14. A combination faucet in accordance with claim 13, said combination faucet further comprising:

temperature detection means for detecting the temperature of said water mixture; and pre-load control means for controlling said pre-load adjustment means to compensate for deviation between temperature of said water mixture detected by said temperature detection means and said target temperature after the setting of said pre-load by said pre-load setting means.

15. A method of mixing hot water with cold water, said method comprising steps of:

1. regulating a mixing ratio of said hot water to said cold water based on a position of a movable valve member disposed in a mixing valve;

2. determining the position of said movable valve member by:

(2a) pressing said movable valve member with a first spring in a predetermined first direction for reducing the mixing ratio of hot water to cold water in response to an increase in a temperature of a water mixture of hot water and cold water flowing out of said mixing valve, said first spring being composed of a material which varies a spring constant of said first spring according to a temperature variation in a predetermined temperature change; and (2b) pressing said movable valve member with a second spring in a predetermined second direction opposite to said predetermined first direction, said method further comprising steps of:

3. adjusting a pre-load of at least one spring of said first spring and said second spring to set said pre-load equal to an initial value corresponding to a target temperature of said water mixture;

4. detecting the temperature of said water mixture after said step 3; and 5. when the temperature of said water mixture detected in said step 4, deviates from said target temperature, adjusting the pre-load of at least one spring of said first spring and said second spring to compensate for said deviation.

16. A method of mixing hot water with cold water, said method comprising steps of:

1. regulating a mixing ratio of said hot water to said cold water based on a position of a movable valve member disposed in a mixing valve;

2. determining the position of said movable valve member by:

(2a) pressing said movable valve member with a first spring in a predetermined first direction for reducing the mixing ratio of hot water to cold water in response to an increase in a temperature of a water mixture of hot water and cold water flowing out of said mixing valve, said first spring being composed of a material which varies a spring constant of said first spring according to a temperature variation in a predetermined temperature change; and (2b) pressing said movable valve member with a second spring in a predetermined second direction opposite to said predetermined first direction, said method further comprising steps of:

3. detecting the temperature of said water mixture;

4. when the temperature of said water mixture detected in said step 3, deviates from a target temperature, determining a gain of a feed-back control based on mixing conditions of hot water and cold water; and 5. feed-back controlling the pre-load of at least one spring of said first spring and said second spring based on said gain to compensate for said deviation.

17. A method of mixing hot water with cold water, said method comprising steps of:

1. regulating a mixing ratio of said hot water to said cold water based on a position of a movable valve member disposed in a mixing valve;

2. determining the position of said movable valve member by:

(2a) pressing said movable valve member with a first spring in a predetermined first direction for reducing the mixing ratio of hot water to cold water in response to an increase in a temperature of a water mixture of hot water and cold water flowing out of said mixing valve, said first spring being composed of a material which varies a spring constant of said first spring according to a temperature variation in a predetermined temperature change; and (2b) pressing said movable valve member with a second spring in a predetermined second direction opposite to said predetermined first direction, said method further comprising steps of:

3. adjusting a pre-load of at least one spring of said first spring and said second spring to set said pre-load equal to an initial value corresponding to a target temperature of said water mixture;

4. detecting the temperature of said water mixture after said step 3;

5. when the temperature of said water mixture detected in said step 4 deviates from said target mixture, determining whether a feed-back control routine is to be executed or not based on a magnitude of said deviation; and 6. when execution of said feed-back control routine is determined in said step 5, controlling the pre-load of at least one of said first spring and said second spring to compensate for said deviation.

18. A method of mixing hot water with cold water, said method comprising steps of:

1. regulating a mixing ratio of said hot water to said cold water based on a position of a movable valve member disposed in a mixing valve;

2. determining the position of said movable valve member by:

(2a) pressing said movable valve member with a first spring in a predetermined first direction for reducing the mixing ratio of hot water to cold water in response to an increase in a temperature of a water mixture of hot water and cold water flowing out of said mixing valve, said first spring being composed of a material which varies a spring constant of said first spring according to a temperature variation in a predetermined temperature change; and (2b) pressing said movable valve member with a second spring in a predetermined second direction opposite to said predetermined first direction, said method further comprising steps of:

3. storing a relationship between a target temperature of said water mixture and a pre-load;

4. adjusting a pre-load of at least one spring of said first spring and said second spring and setting said pre-load equal to an initial value corresponding to a target temperature of said water mixture based on the relationship stored in said step 3;

5. detecting the temperature of said water mixture after said step 4;

6. when the temperature of said water mixture detected in said step 5, deviates from said target temperature, adjusting the pre-load of at least one spring of said first spring and said second spring to compensate for said deviation; and 7. updating the relationship stored in said step 3, with a new set of values of said target temperature and said pre-load when a predetermined condition is fulfilled between said deviation of the temperature of said water mixture detected by said temperature detection means and said target temperature.

19. A method of mixing hot water with cold water, said method comprising steps of:

1. regulating a mixing ratio of said hot water to said cold water based on a position of a movable valve member disposed in a mixing valve;

2. determining the position of said movable valve member by:

(2a) pressing said movable valve member with a first spring in a predetermined first direction for reducing the mixing ratio of hot water to cold water in response to an increase in a temperature of a water mixture of hot water and cold water flowing out of said mixing valve, said first spring being composed of a material which varies a spring constant of said first spring according to a temperature variation in a predetermined temperature change; and (2b) pressing said movable valve member with a second spring in a predetermined second direction opposite to said predetermined first direction, said method further comprising steps of:

3. storing a plurality of relations between a pre-load and a target temperature of said water mixture;

4. based on inputs of predetermined data, selecting a first of said plurality of relations between the pre-load and the target temperature stored in said step 3; and 5. adjusting the pre-load of at least one spring of said first spring and said second spring and setting the pre-load equal to an initial value corresponding to a target temperature, based on said first relation selected in said step 4.

* * * * *